(12) United States Patent
Tamayama

(10) Patent No.: US 8,310,414 B2
(45) Date of Patent: Nov. 13, 2012

(54) METHOD AND APPARATUS FOR PROCESSING INFORMATION, RECORDING MEDIUM, AND COMPUTER PROGRAM

(75) Inventor: Ken Tamayama, Tokyo (JP)

(73) Assignee: Sony Corporation, Tokyo (JP)

( * ) Notice: Subject to any disclaimer, the term of this patent is extended or adjusted under 35 U.S.C. 154(b) by 1196 days.

(21) Appl. No.: 11/221,749

(22) Filed: Sep. 9, 2005

(65) Prior Publication Data

US 2006/0077200 A1    Apr. 13, 2006

(30) Foreign Application Priority Data

Oct. 13, 2004 (JP) .................................. 2004-299216

(51) Int. Cl.
*G09G 3/30* (2006.01)

(52) U.S. Cl. ............... 345/76; 345/77; 345/78; 345/690

(58) Field of Classification Search .............. 345/76–82, 345/690, 87–102, 211–215; 315/169.3; 349/61
See application file for complete search history.

(56) References Cited

U.S. PATENT DOCUMENTS

| | | | | |
|---|---|---|---|---|
| 5,060,267 A | * | 10/1991 | Yang | 704/258 |
| 6,498,577 B1 | * | 12/2002 | Lin | 341/156 |
| 6,498,592 B1 | * | 12/2002 | Matthies | 345/1.1 |
| 6,903,516 B2 | * | 6/2005 | Tanada | 315/169.4 |
| 7,286,105 B2 | * | 10/2007 | Akimoto et al. | 345/82 |
| 2003/0193472 A1 | * | 10/2003 | Powell | 345/102 |
| 2005/0088379 A1 | * | 4/2005 | Tsuchida | 345/76 |
| 2005/0168490 A1 | * | 8/2005 | Takahara | 345/690 |
| 2009/0184984 A1 | * | 7/2009 | Takahara | 345/690 |

FOREIGN PATENT DOCUMENTS

| | | |
|---|---|---|
| JP | 2003-330418 | 11/2003 |
| JP | 2004-29755 | 1/2004 |
| JP | 2004-279990 | 10/2004 |
| WO | WO 01/63587 A2 | 8/2001 |
| WO | WO 03/091979 A1 | 11/2003 |

\* cited by examiner

*Primary Examiner* — Amare Mengistu
*Assistant Examiner* — Koosha Sharifi-Tafreshi
(74) *Attorney, Agent, or Firm* — Oblon, Spivak, McClelland, Maier & Neustadt, L.L.P.

(57) ABSTRACT

An information processing apparatus includes a self-luminous type display, a current value predicting unit for predicting, based on a pixel value of a next image, the value of a current required by the display that displays the next image, and a controller for controlling luminance of the display based on the predicted current value.

12 Claims, 14 Drawing Sheets

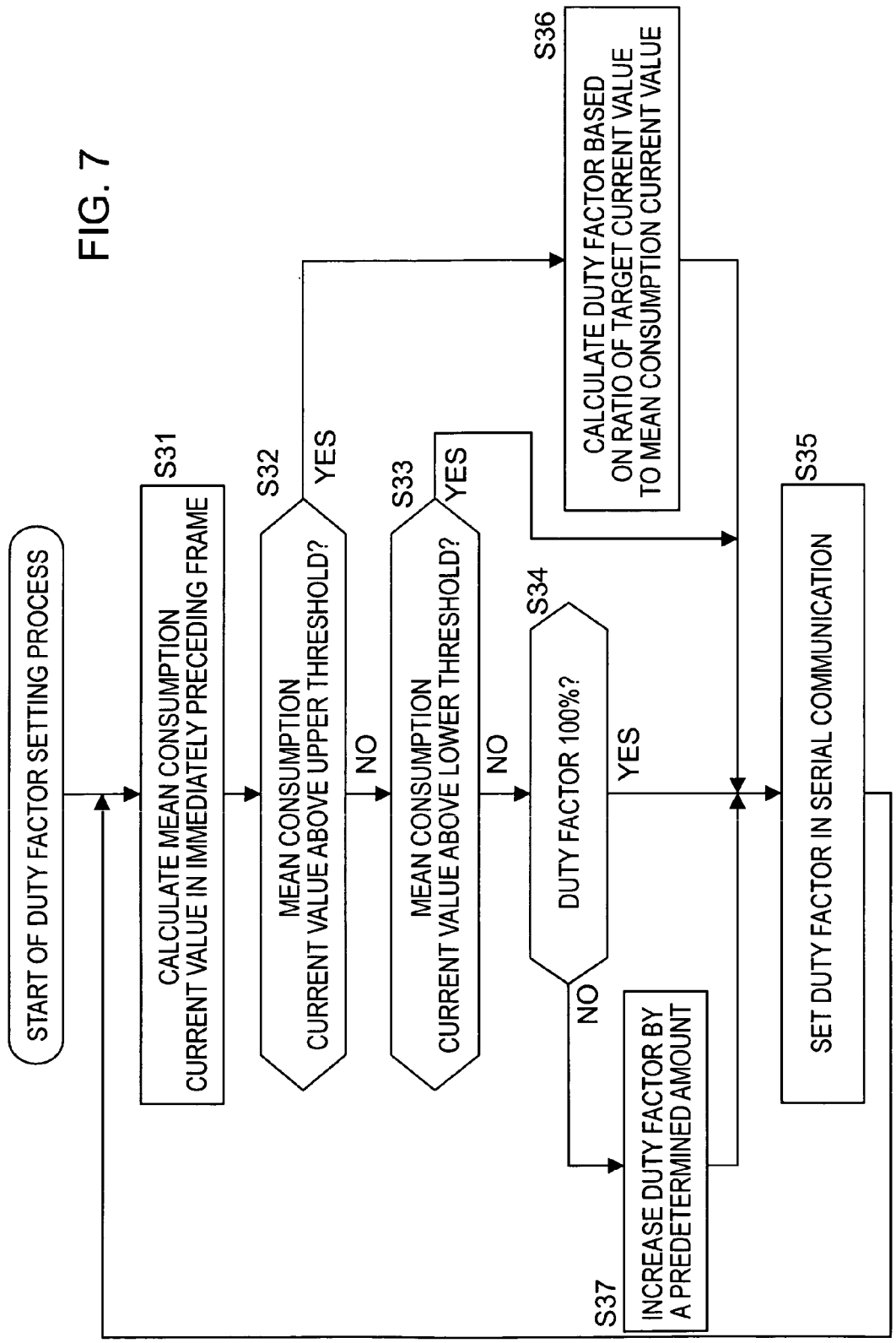

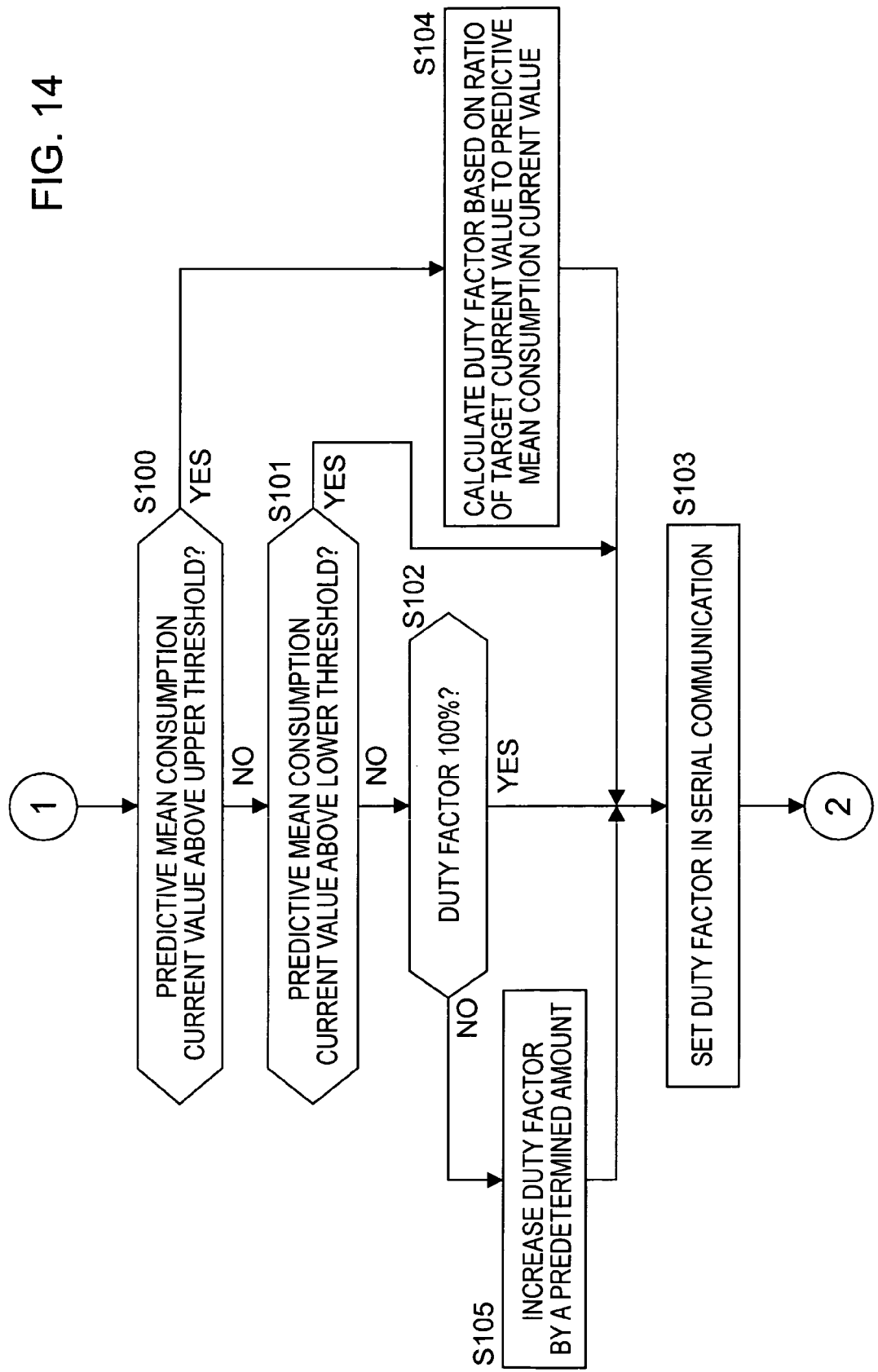

METHOD AND APPARATUS FOR PROCESSING INFORMATION, RECORDING MEDIUM, AND COMPUTER PROGRAM

CROSS REFERENCES TO RELATED APPLICATIONS

The present invention contains subject matter related to Japanese Patent Application JP 2004-299216 filed in the Japanese Patent Office on Oct. 13, 2004, the entire contents of which are incorporated herein by reference.

BACKGROUND OF THE INVENTION

1. Field of the Invention

The present invention relates to an information processing apparatus, an information processing method, a recording medium, and a computer program and, in particular, to an information processing apparatus, an information processing method, a recording medium, and a computer program for reducing power consumed to display a bright image.

2. Description of the Related Art

Mobile devices, such as a digital mobile telephone and a personal digital assistant (PDA), are currently widely used. A compact display, such as a liquid-crystal display, is typically employed in such mobile devices.

The development of displays employing a self-luminous type display element such as an organic electronic luminescent (EL) element are in progress. For example, a display constructed of the organic EL element provides advantages over a display constructed of a liquid-crystal display (LCD). For example, the organic EL display is thinner than the LCD.

To use the organic EL display, a variety of problems needs to be solved. For example, luminance of the display needs to be stabilized. In the known displays, such as a cathode-ray tube (CRT), the technique of an auto brightness limiter (ABL) to limit the mean luminance level of a displayed image to less than predetermined value is used to protect the phosphor screen of the CRT, to control power consumption, and to improve image quality. In accordance with the technique, luminance of the displayed image is adjusted based on the mean value of the luminance of the displayed image.

Japanese Unexamined Patent Application Publication No. 2001-117535 discloses a technique of using an organic EL display. In accordance with the disclosure, a regulated voltage is applied to an organic EL display. A drive current supplied to the organic EL display is measured at a predetermined timing. Based on the measurement results, the regulated voltage is controlled so that the organic EL display is maintained to a constant drive state.

SUMMARY OF THE INVENTION

The higher the mean luminance of the displayed image, the more current the self-luminous organic EL display consumes. If a known mobile device having an organic EL display operated from a battery displays a high-luminance image, a large current is drawn and the power of the battery is quickly consumed.

To extend the service life of a battery, the entire displayed image is darkened with the brightness thereof reduced to reduce the consumed current.

A large current flowing to display a high-luminance image causes a voltage drop across an internal resistor of the battery, thereby reducing the output voltage of the battery. At the moment a bright image is displayed, the voltage of the battery drops below a lower voltage limit required to operate the mobile device. The battery is thus completely drained. More specifically, if the mobile device having the self-luminous display element displays a bright image, the entire mobile device malfunctions.

It is thus desirable to provide a mobile device having a self-luminous display element displaying a high-luminance image in a stabilized manner with an extended battery service life.

An information processing apparatus of one embodiment of the present invention includes a self-luminous type display, a current value predicting unit for predicting, based on a pixel value of a next image, the value of a current required by the display that displays the next image, and a controller for controlling luminance of the display based on the predicted current value.

The current value predicting unit preferably predicts the current value by dividing the mean value of the pixel values of the next image by a coefficient representing the efficiency of light emission of the display.

The current value predicting unit preferably includes a mean value calculator that calculates the mean value of the pixel values of the next image by reducing the next image to a single pixel.

The controller preferably controls the luminance of the display by controlling, based on the predicted current value, the length of time throughout which the display emits light within a frame period.

In accordance with another embodiment of the present invention, an information processing method of an information processing apparatus with a self-luminous display, includes steps of predicting, based on a pixel value of a next image, the value of a current required by the display that displays the next image, and controlling luminance of the display based on the predicted current value.

In accordance with yet another embodiment of the present invention, a recording medium stores a computer program for causing a computer to process information. The computer program includes program code for performing steps of predicting, based on a pixel value of a next image, the value of a current required by a display that displays the next image, and controlling luminance of the display based on the predicted current value.

In accordance with still another embodiment of the present invention, a computer program for causing a computer to process information, includes program code for performing steps of predicting, based on a pixel value of a next image, the value of a current required by a display that displays the next image, and controlling luminance of the display based on the predicted current value.

In accordance with embodiments of the present invention, the value of the current expected to consume to display the next image on the display is predicted based on the pixel value of the next image to be displayed. The luminance of the display is thus controlled based on the predicted current value.

In accordance with embodiments of the present invention, the information processing apparatus displays a bright image while operating in a stabilized manner with a battery operation time prolonged.

BRIEF DESCRIPTION OF THE DRAWINGS

FIG. 7 is a flowchart illustrating a duty factor setting process;

FIG. 14 is a continuation of the flowchart of FIG. 13; and

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An information processing apparatus (for example, a PDA 1 of FIG. 1) of one embodiment of the present invention includes a self-luminous type display (for example, a display device 27 of FIG. 12), a current value predicting unit (for example, dividers 351 through 353 of FIG. 12) for predicting, based on a pixel value of a next image, the value of a current required by the display that displays the next image, and a controller (for example, a duty factor setter 403 of FIG. 12) for controlling luminance of the display based on the predicted current value.

Figure 13:
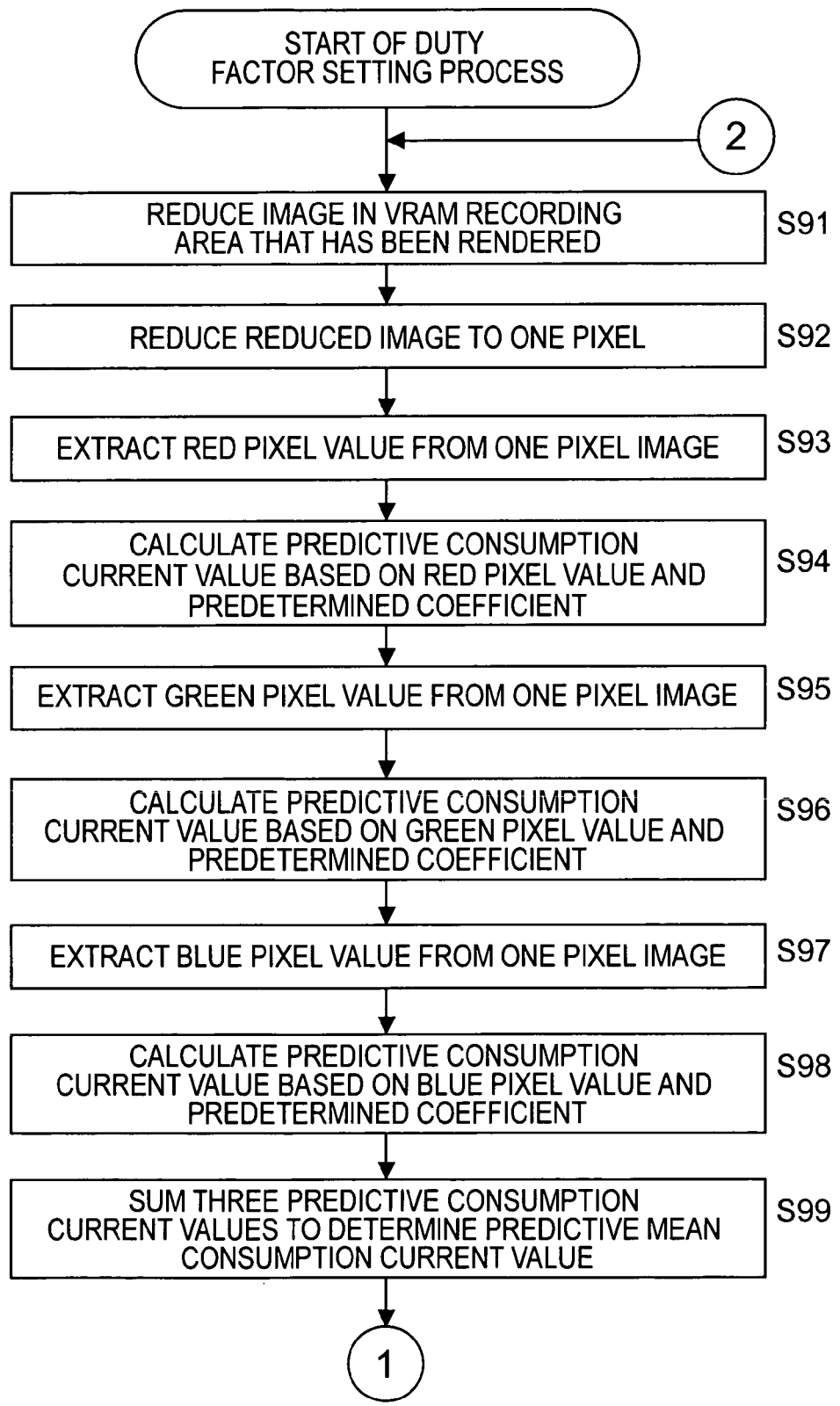
FIG. 13 is a flowchart illustrating the duty factor setting process.

The current value predicting unit preferably predicts the current value by dividing the mean value of the pixel values of the next image by a coefficient representing the efficiency of light emission of the display (for example, in steps S94, S96, and S98 of FIG. 13).

The current value predicting unit includes a mean value calculator (for example, an adder 361 of FIG. 12) that calculates the mean value of the pixel values of the next image by reducing the next image to a single pixel (for example, in step S92 of FIG. 13).

The controller controls the luminance of the display by controlling, based on the predicted current value, the length of time throughout which the display emits light within a frame period (for example, in step S103 of FIG. 14).

In accordance with another embodiment of the present invention, an information processing method of an information processing apparatus (for example, the PDA 1 of FIG. 1) with a self-luminous display (for example, the display device 27 of FIG. 12), includes steps of predicting, based on a pixel value of a next image, the value of a current required by the display that displays the next image (for example, in steps S94, S96, and S98 of FIG. 13), and controlling luminance of the display based on the predicted current value (for example, in step S103 of FIG. 14).

In accordance with yet another embodiment of the present invention, a computer program for causing a computer to process information, includes program code for performing steps of predicting, based on a pixel value of a next image, the value of a current required by a display that displays the next image (for example, in steps S94, S96, and S98 of FIG. 13), and controlling luminance of the display based on the predicted current value (for example, in step S103 of FIG. 14).

In accordance with still another embodiment of the present invention, a recording medium stores a computer program for causing a computer to process information. The computer program includes program code for performing steps of predicting, based on a pixel value of a next image, the value of a current required by a display that displays the next image (for example, in steps S94, S96, and S98 of FIG. 13), and controlling luminance of the display based on the predicted current value (for example, in step S103 of FIG. 14).

The embodiments of the present invention are described below with reference to the drawings.

Figure 1:
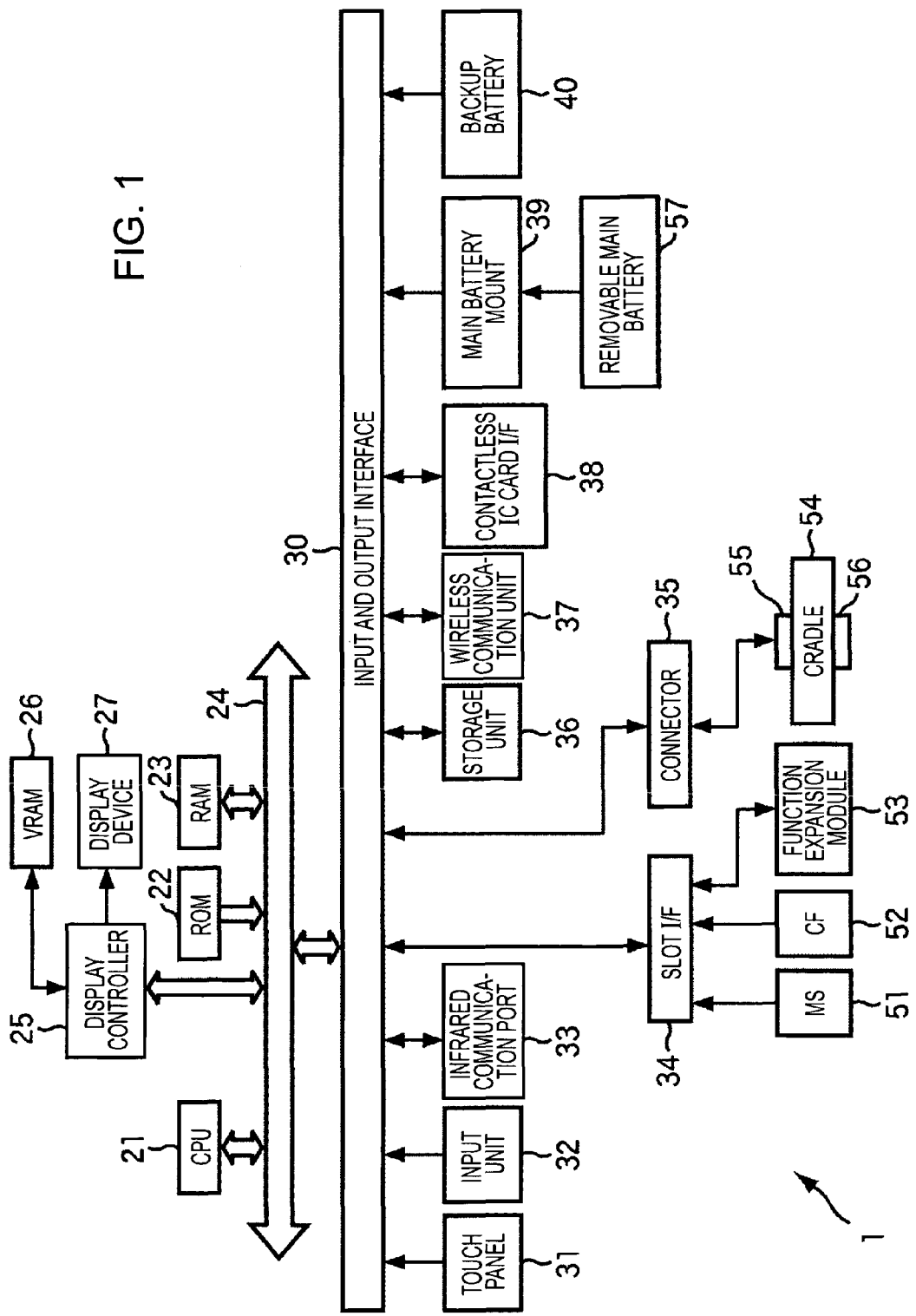
FIG. 1 is a block diagram illustrating a personal digital assistant (PDA) in accordance with one embodiment of the present invention.

FIG. 1 is a block diagram illustrating a personal digital assistant (PDA) 1 of one embodiment of the present invention. The PDA 1 is a mobile information terminal having an operating system such as PalmOS®.

A central processing unit (CPU) 21 performs a variety processes in accordance with one of a program stored in a read-only memory (ROM) 22 and an application program loaded from a storage unit 36 to a random-access memory (RAM) 23, and silk plugin. The RAM 23 also stores data required by the CPU 21 when the CPU 21 performs a variety of processes.

The CPU 21, the ROM 22 and the RAM 23 are mutually interconnected via a bus 24. A display controller 25 is connected to the bus 24. The display controller 25 controls the displaying of images to a display device 27.

The display controller 25 connects to a video random access memory (VRAM) 26 storing image data corresponding to an image to be displayed on the display device 27, and the display device 27 constructed of an organic electroluminescent (EL) display 121 to be discussed later with reference to FIG. 3. The display controller 25 generates image data based on video data stored in memories (including the RAM 23, a storage unit 36, a memory Stick® (hereinafter referred to as MS) 51, and a compact Flash™ (hereinafter referred to as CF) 52), and causes the VRAM 26 to store the generated image data. The display controller 25 displays an image corresponding to the video data based on the image data stored in the VRAM 26.

An input and output interface 30 is connected to the bus 24.

Also, the input and output interface 30 is connected to a transparent touchpanel 31 covering a major portion of the surface of the display device 27 (i.e., the surface of the organic EL display 121), an input unit 32 including a jog dial, a variety of buttons, and a keyboard, and an infrared communication port 33.

The CPU 21 includes an input/output touch panel controller controlling the touchpanel 31. Coordinates detected by the touchpanel 31 are fed to the CPU 21 via the input and output interface 30 and the bus 24. The CPU 21 acquires predetermined information corresponding to the fed coordinates. More specifically, when a user places one of a finger tip and a pen into contact with the organic EL display 121, the touchpanel 31 detects the coordinates of the contact point. The CPU 21 performs a predetermined process responsive to the detected coordinates.

The input and output interface 30 connects to a slot interface 34 that is one of an MS slot for receiving the MS 51 as one type of non-volatile semiconductor memory and a CF slot for receiving the CF 52 as one type of non-volatile semiconductor memory.

The input and output interface 30 can receive a communication function expansion module (IOMS) 53. The function expansion module 53 is a Bluetooth™ type function expansion module having the same dimensions as the MS 51.

The input and output interface 30 connects to a connector 35. The connector 35 is used to connect to an attachment unit such as a cradle 54. A removable main battery 57 and a backup battery 40 are charged by the attachment unit. The attachment unit also serves as a relay unit for communication with an external device having a universal serial bus (USB) cable connection.

The cradle 54 includes a connector 55 for connection with the PDA 1 (connector 35), and a USB connector 56 for connection with an external device having a USB cable connection.

The input and output interface 30 connects to a storage unit 36 including one of an electrically erasable programmable read-only memory (EEPROM) and a hard disk. Also, the input and output interface 30 connects to a wireless communication unit 37 performing radio communications in accordance with Bluetooth and a contactless integrated circuit (IC) card interface 38 that reads and writes data from and to an IC card, such as FeLica®.

The application program and silk plugin read from one of the MS 51 and the CF 52 inserted into the slot interface 34 are installed onto the storage unit 36 as appropriate.

Computer programs (such as the application program and silk plugin) are read onto the PDA 1 from a magnetic disk, an optical disk, a magneto-optic disk, and a semiconductor memory loaded onto the external device connected to the PDA 1 via the cradle 54 and the connector 35. The computer program and data can also be transmitted to the PDA 1 using one of infrared communication via the infrared communication port 33, wireless communication via the wireless communication unit 37, and wired communication via the cradle 54. As necessary, the computer program and data are supplied to the PDA 1 and installed onto the storage unit 36.

The input and output interface 30 also connects to a main battery mount 39 with the removable main battery 57, such as a lithium-ion battery, for supplying power to the PDA 1, and a backup battery 40, such as a rechargeable button battery. The backup battery 40 serves as a backup when the removable main battery 57 is removed.

Figure 2:
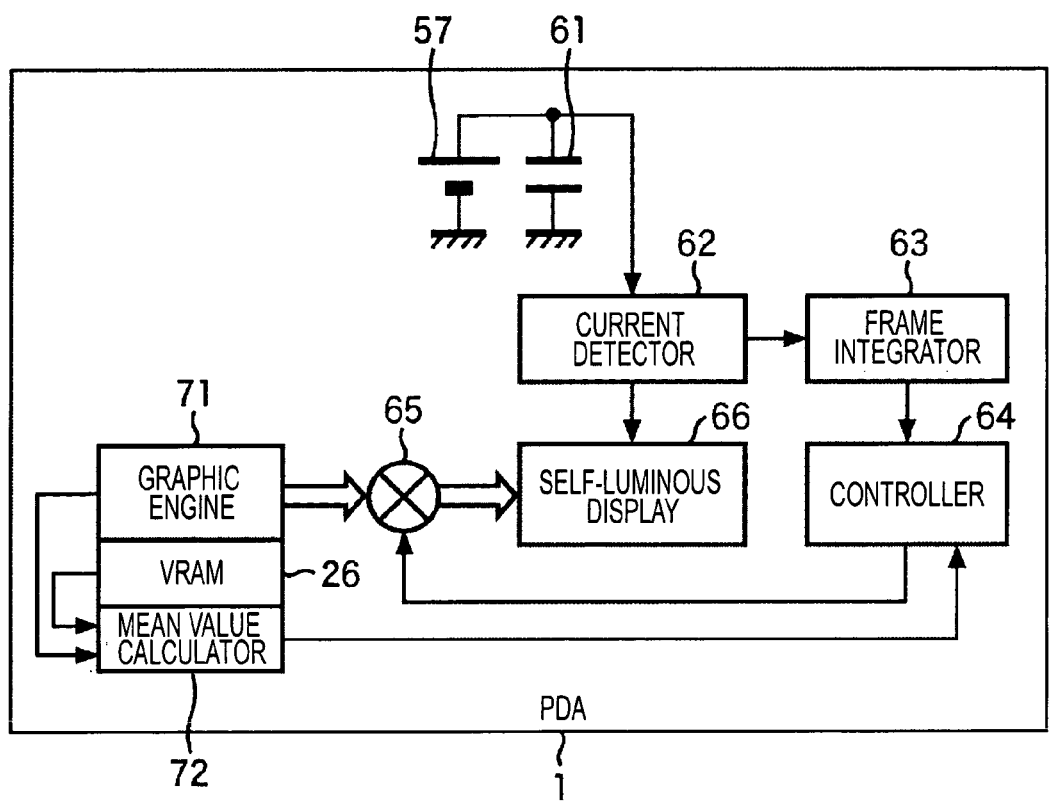
FIG. 2 is a block diagram illustrating the PDA in accordance with the embodiment of the present invention.

The removable main battery 57 is not limited to lithium battery, and may be one of a primary battery and a secondary battery. For example, the removable main battery 57 can be one of a lithium polymer battery, a nickel-hydrogen battery, an alkaline battery, and a manganese battery, FIG. 2 is a block diagram of the PDA 1. The PDA 1 includes the removable main battery 57, a capacitor 61, a current detector 62, a frame integrator 63, a controller 64, a luminance adjuster (mixer) 65, a self-luminous display 66, a graphic engine 71, a VRAM 26, and a mean value calculator 72.

The removable main battery 57 is configured with a positive terminal thereof connected to one terminal of the capacitor 61 and the current detector 62, and a negative terminal thereof grounded. The removable main battery 57 supplies current to the capacitor 61 and the current detector 62. For example, the voltage of the removable main battery 57 is 3.7 V.

The other terminal of the capacitor 61 is grounded. The capacitor 61 of an electrical double layer type stores current supplied from the removable main battery 57, and supplies stored current to the current detector 62. The capacitance of the capacitor 61 is about 250 mF.

When a current flows from the removable main battery 57 in a manner such that the voltage across the capacitor 61 charged to display a high-luminance image on the self-luminous display 66 is higher than the voltage of the removable main battery 57, the capacitor 61 discharges stored current thereby reducing the current from the removable main battery 57.

When a low-luminance image is displayed subsequent to the displaying of the high-luminance image, the voltage across the capacitor 61 becomes lower than the output voltage from the removable main battery 57. The capacitor 61 stores current from the removable main battery 57.

The current detector 62 feeds, to the self-luminous display 66, a current supplied from one of the removable main battery 57 and the capacitor 61. The current detector 62 feeds the value of a current supplied from one of the removable main battery 57 and the capacitor 61 to the frame integrator 63 every predetermined period of time shorter than the frame period.

The frame integrator 63 integrates the current value supplied from the current detector 62 over one frame of a moving image to be displayed on the self-luminous display 66, and divides the integrated value by one frame period. The frame integrator 63 thus calculates the mean value of the current consumed every frame, and supplies the calculated mean value of the current to the controller 64.

The controller 64 calculates the duty factor of the light on and off of each pixel over one frame based on the mean consumption current value supplied from the frame integrator 63, and supplies the calculated duty factor to the luminance adjuster 65. The duty factor is the ratio of the length of light-on time to the overall frame period.

The luminance adjuster 65 controls the light-on and light-off of each pixel based on the duty factor supplied from the controller 64, and causes the self-luminous display 66 to display an image output from the graphic engine 71.

In a double buffer process, the VRAM 26 supplies, to the graphic engine 71, image data of a frame immediately prior to a frame currently displayed on the self-luminous display 66.

The graphic engine 71 reduces the image data of one frame supplied from the VRAM 26 and supplies the reduced image (video data) to the mean value calculator 72.

The mean value calculator 72 further reduces the reduced image data supplied from the graphic engine 71 to a single pixel, and extracts a pixel value of red color, a pixel value of green color, and a pixel value of blue color, and divides the pixel values by predetermined coefficients of the respective colors. The coefficient is a ratio of current value to the luminance of each color. By dividing the pixel value representing the luminance of each color by the coefficient of the color, a current value required to display the color image is calculated.

The mean value calculator 72 sums the quotients as a result of division by the coefficients, and supplies the sum, namely, a predicted consumption current required to display an image on the self-luminous display 66, to the controller 64.

In response to the predicted consumption current value supplied from the mean value calculator 72, the controller 64 sets the duty factor of light-on and light-off operations of each pixel over frame, and supplies the set duty factor to the luminance adjuster 65.

The controller 64 receives information relating to switching of application programs performed by the user of the PDA 1 and luminance set by the user and serving as a reference of an image to be displayed on the self-luminous display 66. Based on the switching of the application program and the setting information of the luminance set by the user, the controller 64 sets the duty factor and supplies the set duty factor to the luminance adjuster 65.

The removable main battery 57, the capacitor 61, the current detector 62, the frame integrator 63, the controller 64, the luminance adjuster 65, and the self-luminous display 66 shown in FIG. 2 are further discussed with reference to FIG. 3.

The display controller 25 includes the graphic engine 71 and a micro controller 101 corresponding to the controller 64. The display device 27 includes an organic EL display 121 corresponding to the self-luminous display 66 and an organic EL display driver 122 corresponding to the luminance adjuster 65.

A current-voltage converter 91 and an AD converter 111 correspond to the current detector 62.

The current-voltage converter 91 supplies current from the removable main battery 57 to the display device 27. The current-voltage converter 91 converts a current (value) supplied from the removable main battery 57 and consumed by the organic EL display 121 to display an image into a voltage, and supplies, to the AD (analog-to-digital) converter 111 in the micro controller 101, the analog data representing the voltage responsive to the current to be consumed by the organic EL display 121.

The micro controller 101 is an embedded micro processing unit (MPU), for example. The AD converter 111 is contained in the micro controller 101 as shown in FIG. 3. Alternatively, the AD converter 111 may be external to the micro controller 101.

The AD converter 111 analog-to-digital converts a voltage signal supplied from the current-voltage converter 91 to a digital signal.

In response to signals from the input unit 32 operated by the user, the CPU 21 supplies, to the serial communication interface 112 in the micro controller 101, the setting information of luminance serving as a reference of an image to be displayed on the organic EL display 121 and a signal notifying of the switching of the application program. The serial communication interface 112 performs serial communications with each of the CPU 21 and the micro controller 101.

The AD converter 111 converts the current, consumed by the organic EL display 121 that displays an image, into the digital voltage data. In response to the digital voltage data, the micro controller 101 calculates the mean consumption current value as the mean value of the current consumed to display the image (frame), and calculates the duty factor of the light-on and light-off operation of each pixel in the displayed image (frame image).

The micro controller 101 supplies the calculated duty factor to the organic EL display driver 122 via the serial communication interface 113. The serial communication interface 113 performs serial communications between the micro controller 101 and the display device 27 (organic EL display driver 122).

In response to a control signal supplied from the CPU 21, the graphic engine 71 outputs the image data to the organic EL display 121. The graphic engine 71 supplies, to the micro controller 101, a signal indicating the start of a vertical blanking period in the (moving) image displayed on the organic EL display 121.

The organic EL display 121 includes a plurality of organic EL display elements. In response to the duty factor supplied from the micro controller 101, the organic EL display driver 122 feeds a current to the organic EL display 121 to display an image thereon.

Figure 4:
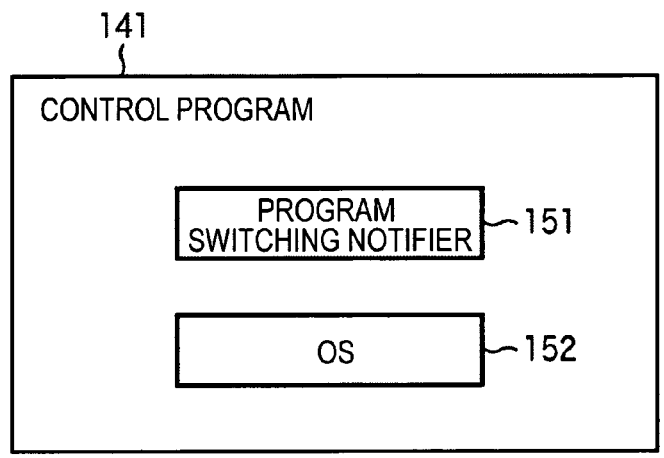
FIG. 4 is a block diagram illustrating the functional structure of a control program performed by a central processing unit (CPU)

FIG. 4 is a block diagram illustrating the functional structure of a control program 141 executed by the CPU 21. The control program 141 includes a program switching notifier 151 and an operating system (OS) 152.

In response to a user operation of the input unit 32, the program switching notifier 151 detects the application program switched in response to a signal supplied from the input unit 32, and notifies the micro controller 101 of the switching of the application program.

The OS 152 is PalmOS®, for example. More specifically, the OS 152 is a basic program and controls the handling of resources such as hardware of the PDA 1.

Figure 5:
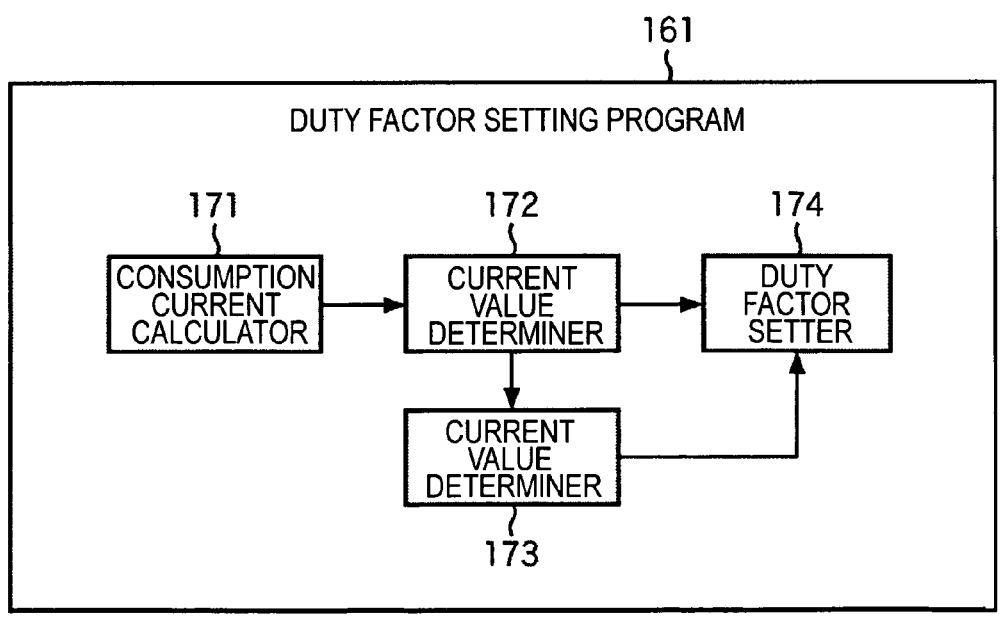
FIG. 5 is a block diagram illustrating the functional structure of a duty factor setting program performed by a micro controller.

FIG. 5 is a block diagram illustrating the functional structure of a duty factor setting program 161 executed by the micro controller 101. The duty factor setting program 161 sets the duty factor of the light-on and light-off operation of each pixel in the displayed image (frame image). The duty factor setting program 161 includes a consumption current calculator 171, a current value determiner 172, a current value determiner 173, and a duty factor setter 174.

Figure 3:
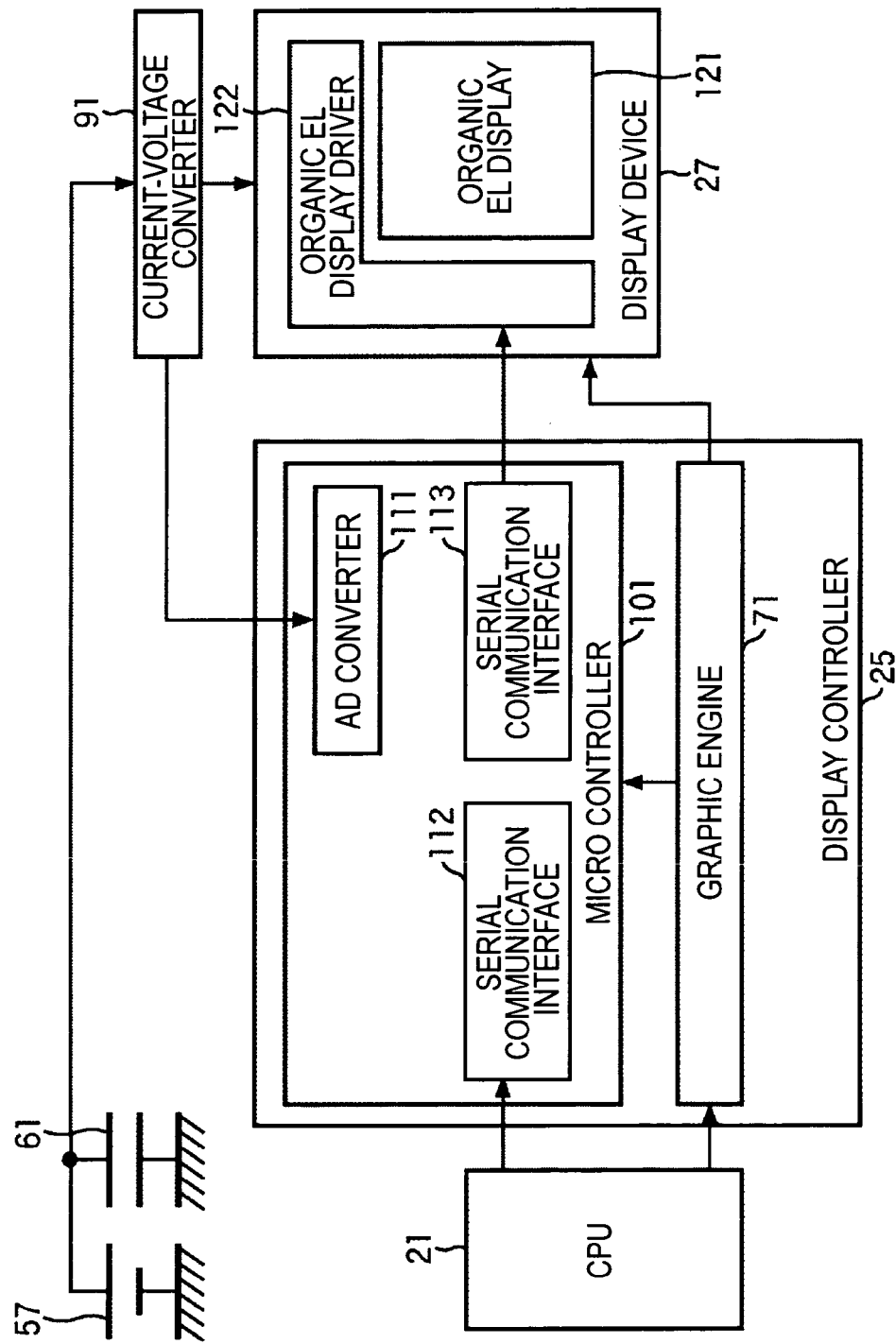
FIG. 3 illustrates a display controller.

In response to one of a signal supplied by the CPU 21 to notify of the startup of the PDA 1 and a signal supplied by the graphic engine 71 to notify of the vertical blanking period, the consumption current calculator 171 calculates the mean value of the current values over one frame (mean consumption current) from the value of the current supplied by the AD converter 111 of FIG. 3 and consumed by the organic EL display 121 in the displaying of the image. The consumption current calculator 171 supplies the calculated mean consumption current value to the current value determiner 172.

The current value determiner 172 determines whether the mean consumption current value supplied from the consumption current calculator 171 is higher than a predetermined threshold. If it is determined that the mean consumption current value is higher than the predetermined threshold set in the current value determiner 172, the current value determiner 172 supplies, to the duty factor setter 174, the determination results representing that the mean consumption current value is higher than the predetermined threshold.

The threshold value the current value determiner 172 compares with the mean consumption current value serves as a determination criterion according to which a determination of whether a current having a magnitude subject to limitation is flown is performed.

If the mean consumption current value is lower than the predetermined threshold, the current value determiner 172 supplies, to the current value determiner 173, the determination results representing that the mean consumption current value is lower than the predetermined threshold and the mean consumption current value supplied from the consumption current calculator 171.

Upon receiving from the current value determiner 172 the determination result that the mean consumption current value is lower than the predetermined threshold, and the mean consumption current value, the current value determiner 173 determines whether the mean consumption current value supplied from the current value determiner 172 is higher than the predetermined threshold set in the current value determiner 173.

The threshold the current value determiner 173 compares with the mean consumption current value is lower than the predetermined threshold of the current value determiner 172 and serves as a threshold according to which a determination of whether to restore luminance of the display is performed.

The current value determiner 173 supplies, to the duty factor setter 174, the determination result of whether the mean consumption current value is higher than the predetermined threshold set in the current value determiner 173.

Based on the determination result supplied from one of the current value determiner 172 and the current value determiner 173, the duty factor setter 174 calculates the duty factor of light-on and light-off operations of each pixel (image) displayed on the organic EL display 121, and supplies the calculated duty factor to the organic EL display driver 122 for setting.

Figure 6:
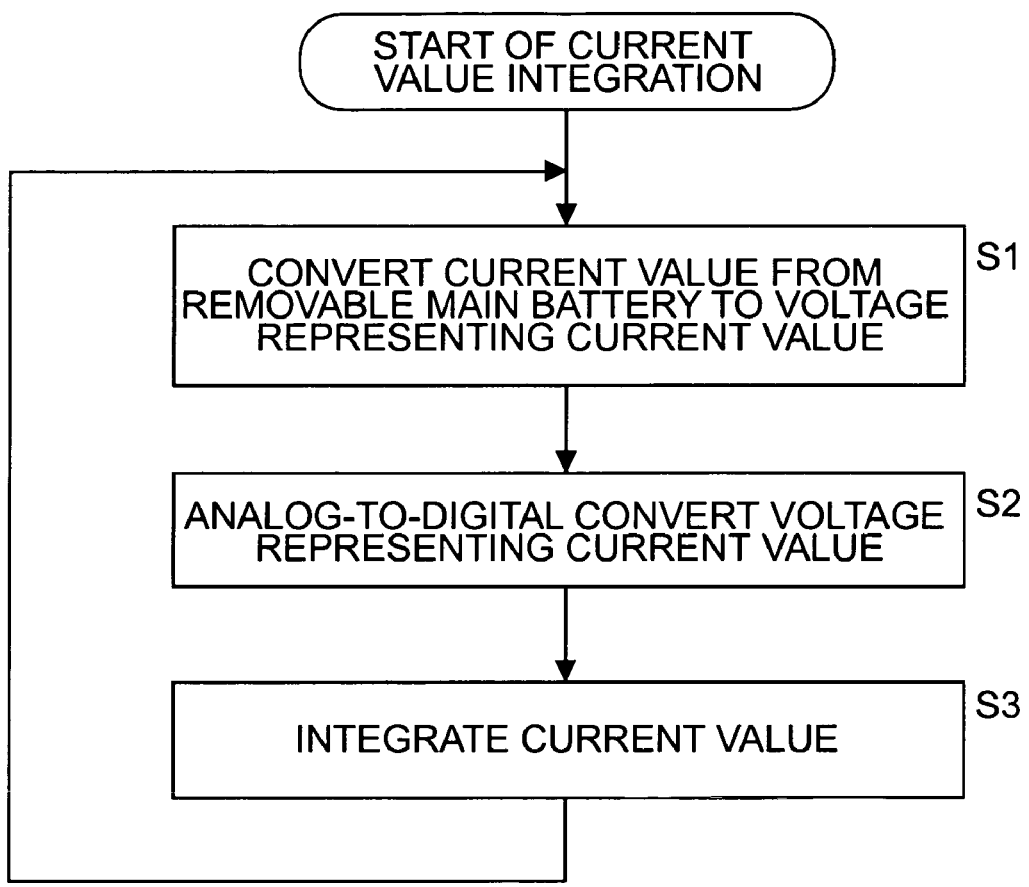
FIG. 6 is a flowchart illustrating an integration process of a current value.

An integration process of the current value is described below with reference to a flowchart of FIG. 6. The integration process is initiated in response to the switch-on of the PDA 1. In step S1, the current-voltage converter 91 converts the value of the current supplied from the removable main battery 57 and consumed to display the image on the organic EL display 121 into the voltage.

In step S2, the AD converter 111 analog-to-digital converts the converted voltage responsive to the value of the current consumed by the organic EL display 121. More specifically, the AD converter 111 converts an analog signal representing the voltage (analog data) into a digital signal (digital data).

For example, in step S2, the AD converter 111 converts the analog signal representing the value of the current consumed to display the image on the organic EL display 121 into digital data every period shorter than one frame period (in a sampling process).

In step S3, the consumption current calculator 171 integrates the digital data of the current consumed to display the image on the organic EL display 121 on each frame. More specifically, the consumption current calculator 171 integrates the current value used for displaying one frame (frame image) in step S3.

Processing returns to step S1 subsequent to step S3. The above process is repeated until the PDA 1 is switched off.

A duty factor setting process is described below with reference to a flowchart of FIG. 7. The duty factor setting process is initiated in response to the switch-on of the PDA 1. In step S31, the consumption current calculator 171 calculates the mean consumption current value consumed to display on the organic EL display 121 a frame immediately prior to the current frame. More specifically, the consumption current calculator 171 divides the current consumed over one frame and integrated in step S3 of FIG. 6 by the number of samplings over one frame, thereby calculating the mean consumption current value.

In step S32, the current value determiner 172 determines whether the mean consumption current value calculated in step S31 is above an upper threshold THa (see FIGS. 8A-8D).

If it is determined in step S32 that the mean consumption current value calculated in step S31 is not above the upper threshold THa, processing proceeds to step S33. The current value determiner 173 determines whether the mean consumption current value calculated in step S31 is above a lower threshold THb.

If it is determined in step S33 that the mean consumption current value calculated in step S31 is not above the lower threshold THb, processing proceeds to step S34. The duty factor setter 174 determines in step S34 whether the duty factor is 100%.

If it is determined in step S34 that the duty factor is 100%, processing proceeds to step S35. The duty factor setter 174 performs serial communications with the organic EL display driver 122 via the serial communication interface 113 to cause the organic EL display driver 122 to set a duty factor of 100%.

FIGS. 8A-8D illustrate the mean luminance within the frame, the duty factor of the organic EL display 121, the current consumed over the frame, and the relationship between the currents of the removable main battery 57 and the capacitor 61.

Figure 8A:
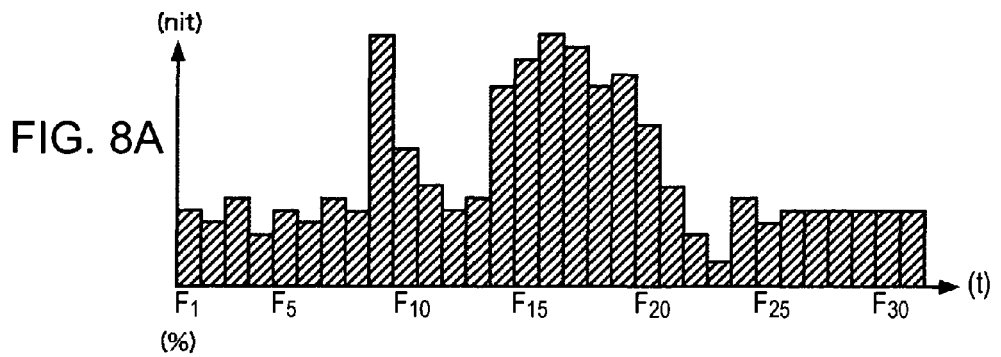
FIGS. 8A-8D illustrate a mean luminance within a frame, a duty factor of an organic EL display, a current consumed to display the frame, and a relationship between currents of a removable main battery and a capacitor.

FIG. 8A illustrates the mean luminance of the frame with the image data displayed as is. As shown in FIG. 8A, the ordinate represents the mean luminance of the frame (nit $(cd/m^2)$), and the abscissa represents frames (frame $F_1$ through frame $F_{31}$) at time t. The mean luminance of an image displayed on a known apparatus within each frame is shown in FIG. 8A.

Figure 8B:
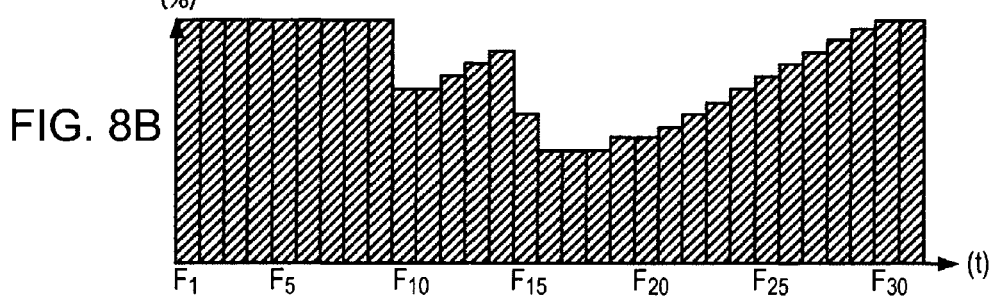

FIG. 8B illustrates the duty factor of the organic EL display 121 on a per frame basis. As shown in FIG. 8B, the ordinate represents the duty factor (%) of the organic EL display 121 and the abscissa represents frames (frame $F_1$ through frame $F_{31}$) at time t.

Figure 8C:
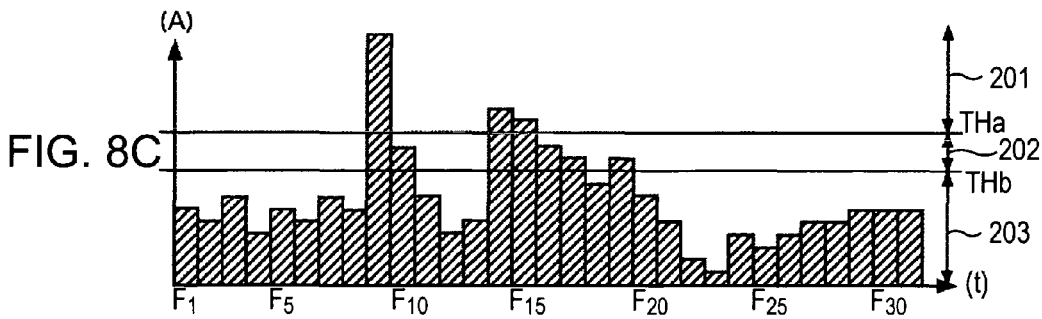

FIG. 8C illustrates the current consumed to display the frames. As shown in FIG. 8C, the ordinate represents the current (in A) consumed to display the frames and the abscissa represents the frames (frame $F_1$ though frame $F_{31}$) at each time t.

Figure 8D:
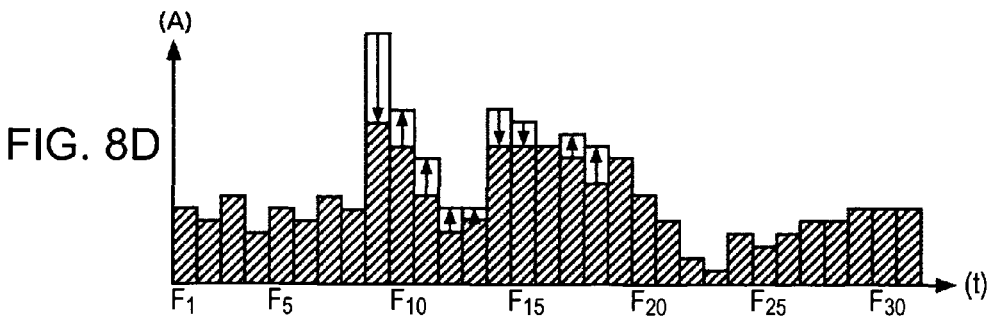

FIG. 8D illustrates the current discharged by the removable main battery 57. As shown in FIG. 8D, the ordinate represents the current of the removable main battery 57 and the abscissa represents the frames (frame $F_1$ though frame $F_{31}$) at each time t.

Herein, the mean luminance (nit $(cd/m^2)$) within one frame is approximately equal to the current consumed to display the image within the frame.

The mean consumption current values of frames $F_1$ through $F_8$ are neither above the upper threshold THa nor above the lower threshold THb as shown in FIG. 8C, and a duty factor of 100% is maintained if the duty factor is 100% as shown in FIG. 8B.

If it is determined in step S32 that the mean consumption current value calculated in step S31 is above the upper threshold THa, processing proceeds to step S36. The duty factor setter 174 calculates the duty factor based on the ratio of a target current within a range assuring a stable operation of the PDA 1 to the mean consumption current value calculated in step S31.

The duty factor $D_{n+1}$ to be calculated by the duty factor setter 174 in step S36 is determined in accordance with the following equation (1) based on a duty factor $D_n$ of the currently displayed frame, the target current value $I_{target}$, and the mean consumption current value $I_n$.

$$D_{n+1} = D_n \times I_{target} / I_n \qquad (1)$$

Processing proceeds to step S35 subsequent to step S36. The duty factor setter 174 performs serial communications with the organic EL display driver 122 via the serial communication interface 113 to cause the organic EL display driver 122 to set the duty factor $D_{n+1}$ calculated in step S36.

As shown in FIG. 8C, the frame $F_9$ is above the upper threshold THa. As shown in FIG. 8B, the duty factor $D_{n+1}$ calculated in step S36 is set at the timing the frame $F_{10}$ subsequent to the frame $F_9$ is displayed. The duty factor $D_{n+1}$ is smaller than the duty factor at the frame $F_9$.

If the mean consumption current value calculated in step S31 is above the upper threshold THa, in other words, if the mean consumption current value is within a region 201 of FIG. 8C, the output voltage of the removable main battery 57 drops due to a high-luminance image displayed on the organic EL display 121. The capacitor 61 discharges stored current corresponding to the amount of current represented by a downward looking arrow of the frame $F_9$ of FIG. 8D, thereby reducing the load imposed on the removable main battery 57. Even if the high-luminance image above the upper threshold THa, such as the frame $F_9$, is suddenly displayed on the organic EL display 121, the PDA 1 can continuously operate without power being lowered below a required lower voltage limit.

If it is determined in step S33 that the mean consumption current value calculated in step S31 is above the lower threshold THb, processing proceeds to step S35. The duty factor setter 174 performs serial communications with the organic EL display driver 122 via the serial communication interface 113 to cause the organic EL display driver 122 to set the current duty factor.

If it is determined in step S33 that the mean consumption current value is above the lower threshold THb, the mean consumption current value falls within a region 202 of FIG. 8C. In the region 202, the duty factor is not changed because the frequent change of luminance of the image displayed on the organic EL display 121 is uncomfortable to the user.

If the process in step S33 is performed on the frame $F_{10}$ of FIG. 8B, the same duty factor as the frame $F_{10}$ is set at the timing of the displaying of the $F_{11}$ as shown in FIG. 8D.

If it is determined in step S34 that the duty factor is not 100%, processing proceeds to step S37. The duty factor setter 174 increases the duty factor by a predetermined amount. For example, the duty factor setter 174 increases the current duty factor by 1% in step S37.

The mean consumption current value is below the lower threshold THb in each of the frames $F_{20}$ through $F_{31}$ as shown in FIG. 8C, in other words, the mean consumption current value falls within a region 203, the duty factor setter 174 increases the duty factor by a predetermined amount bit by bit.

The duty factor is restored bit by bit when dark frames, such as frames $F_{20}$ through $F_{31}$, are displayed after decreasing the duty factor in a bright frame, such as in the frame $F_{15}$.

If the duty factor is suddenly changed by a large amount, a resulting image displayed on the organic EL display 121 becomes uncomfortable to see. For this reason, the duty factor is successively changed bit by bit.

The duty factor is restored back (rises) bit by bit in a ramp in frame $F_{21}$ through frame $F_{31}$ as shown in FIG. 8B.

Processing returns to step S31 subsequent to step S35 to repeat the above-referenced process.

If the mean consumption current value rises above the upper threshold THa as shown in FIG. 8D, the output voltage of the removable main battery 57 drops. The capacitor 61 discharges stored current in frames $F_9$, $F_{14}$, and $F_{15}$ by an amount represented by downward looking arrows in the frames $F_9$, $F_{14}$, and $F_{15}$, thereby lightening the load imposed on the removable main battery 57. The mean consumption current value falls within one of the regions 202 and 203 in each of frames $F_{10}$ through $F_{11}$ and $F_{17}$ and $F_{18}$, and the output voltage of the removable main battery 57 is hither than the voltage across the capacitor 61. The capacitor 61 is thus charged by the current from the removable main battery 57 in an amount represented by an upward looking arrow in each of the frames $F_{10}$ through $F_{11}$ and $F_{17}$ and $F_{18}$.

The duty factor is set to be higher in the frames $F_1$ through $F_8$, each having a low mean luminance (nit) as shown in FIG. 8A while the duty factor is set to be lower in the frames $F_9$ and $F_{15}$ through $F_{20}$, each having a high mean luminance as shown in FIG. 8A.

When a high-luminance frame, such as one of the frames $F_{15}$ through $F_{20}$ is transitioned to a low-luminance frame, such as one of the frames $F_{21}$ through $F_{31}$, the duty factor is set to rise bit by bit. Even if a high-luminance frame such as the frame $F_9$ is suddenly displayed, the capacitor 61 lightens the load imposed on the removable main battery 57. The high-luminance image is displayed while the PDA 1 is reliably operated. The removable main battery 57 provides a longer service life.

With the power of the removable main battery 57 saved, the removable main battery 57 is prevented from generating heat.

Figure 9:
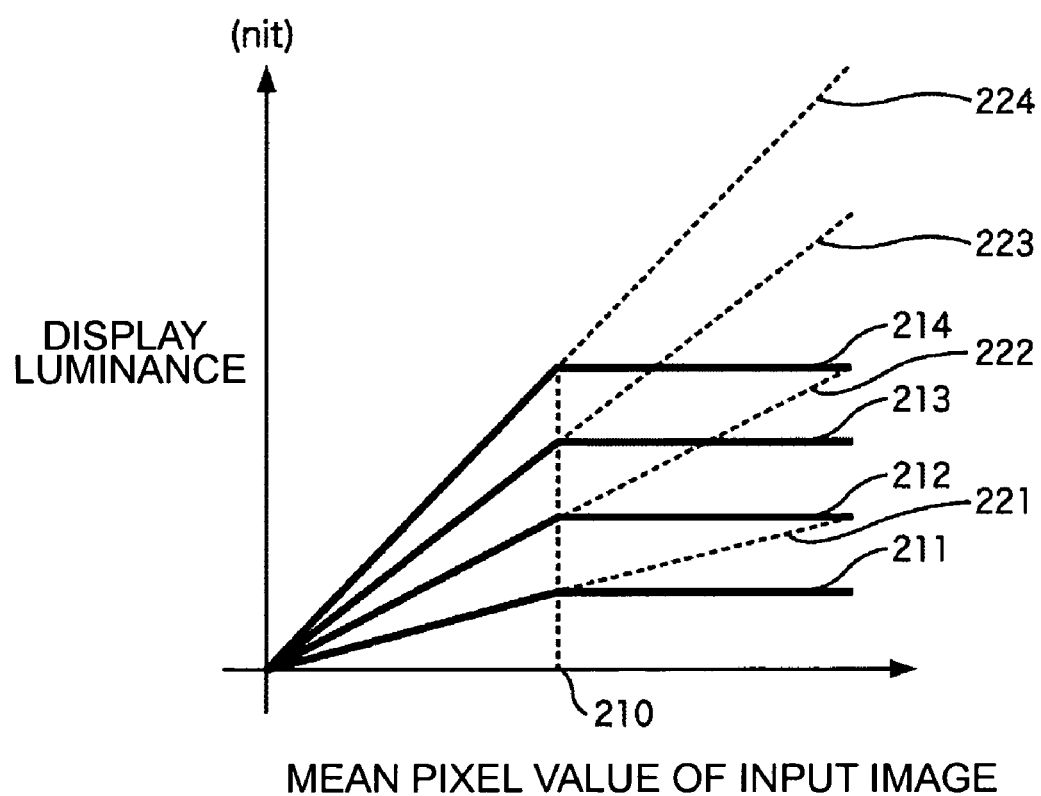
FIG. 9 illustrates the relationship between display luminance and the mean pixel value of an input image.

FIG. 9 illustrates the relationship of the luminance of the organic EL display 121, the mean luminance of the pixel of the image input to the PDA 1 (mean pixel value of an input image), and the luminance serving as a standard of the organic EL display 121 set by a user. The higher the pixel value of the input image, the higher luminance image is presented by the organic EL display 121.

As shown in FIG. 9, the ordinate represents the display luminance (nit) representing the luminance displayed on the organic EL display 121, and the abscissa represents the mean pixel value of the image input to the PDA 1.

Line 211 is a plot of the mean luminance of the image displayed on the organic EL display 121 with luminance serving as a standard of the organic EL display 121 set by the user being 25%.

Line 212 is a plot of the mean luminance of the image displayed on the organic EL display 121 with luminance serving as a standard of the organic EL display 121 set by the user being 50%.

Line 213 is a plot of the mean luminance of the image displayed on the organic EL display 121 with luminance serving as a standard of the organic EL display 121 set by the user being 75%.

Line 214 is a plot of the mean luminance of the image displayed on the organic EL display 121 with luminance serving as a standard of the organic EL display 121 set by the user being 100% (maximum luminance).

As plotted by lines 211 through 214, the display luminance (represented by the ordinate) increases with the mean pixel value of the input image (represented by the abscissa). Beyond the point of a predetermined value 210, the display luminance flattens off at a predetermined constant value even if the mean pixel value of the input image increases.

Broken lines 221 through 224 represent the relationship between the mean pixel value of the input image and the display luminance, corresponding to lines 211 through 214 in accordance with the embodiment of the present invention.

In the broken lines 221 through 224 with the embodiments of the present invention not incorporated therewithin, the higher the mean pixel value of the input image, the higher the display luminance becomes.

With the embodiment of the present invention not incorporated, the display luminance simply becomes higher with the mean pixel value of the input image. The consumption current becomes extremely large, thereby shortening the service life of the removable main battery 57.

In the PDA 1 of the embodiment of the present invention, the display luminance is maintained at a constant value even when the mean pixel value of the input image rises above the value 210, and the consumption current is prevented from excessively increasing. The service life of the removable main battery 57 is thus extended.

A switching process of switching application programs is described below with reference to a flowchart of FIG. 10. The switching process is initiated in response to the switching of the application program. More specifically, the switching process is initiated when the program switching notifier 151 of FIG. 4 notifies the micro controller 101 of the switching of the application program.

In step S61, the duty factor setter 174 performs serial communications with the organic EL display driver 122 via the serial communication interface 113 to cause the organic EL display driver 122 to set a duty factor of 50%. With this setting, the duty factor is lowered at the first frame subsequent to the switching of the application program. No large current is drawn even if the first frame subsequent to the switching of the application program is a bright image.

In step S62, based on the signal representing the vertical blanking period from the graphic engine 7, the consumption current calculator 171 determines whether it is in the vertical blanking period. If it is determined in step S62 that it is not in the vertical blanking period, processing returns to step S62. The process in step S62 is repeated until it is in the vertical blanking period.

If it is determined in step S62 that it is in the vertical blanking period, processing proceeds to step S63. The consumption current calculator 171 calculates the mean consumption current value of the immediately prior frame. More specifically, in step S63, the consumption current calculator 171 calculates the mean consumption current value of the first frame subsequent to the switching of the application program.

In step S64, the consumption current calculator 171 calculates the duty factor $D_{n+1}$ using equation (1) in the same manner as in step S36 of FIG. 7.

In step S65, the duty factor setter 174 performs serial communications with the organic EL display driver 122 via the serial communication interface 113 to cause the organic EL display driver 122 to set the duty factor calculated in step S64.

Since the first frame after the switching of the application program is set to 50%, the luminance of the image can be abruptly changed in response to the duty factor set in step S65. However, the luminance of the image changes at the rerendering of the image, the image does not look unnatural.

In step S66, based on the signal indicating the vertical blanking period from the graphic engine 71, the consumption current calculator 171 determines whether it is in the vertical blanking period. If it is determined in step S66 that it is not yet in the vertical blanking period, the process in step S66 is repeated until it is in the vertical blanking period.

If it is determined in step S66 that it is in the vertical blanking period, processing proceeds to step S67 to set the duty factor. The duty factor setting process has been discussed with reference to the flowchart of FIG. 7.

Processing returns to step S66 subsequent to step S67, namely, step S35 of FIG. 7. The process in step S66 is repeated until switching to another application program is performed.

FIGS. 11A-11C illustrate the mean luminance of the frame, the duty factor of the organic EL display 121, and the relationship between the currents consumed to display the frame.

FIG. 11A illustrates the mean luminance of the frames with the image data displayed as is. As shown in FIG. 11A, the ordinate represents the mean luminance (nit ($cd/m^2$)) of the frames, and the abscissa represents the frames $F_{51}$ through $F_{66}$ at time t. FIG. 11A illustrates the mean luminance of the image at the frames displayed on a known apparatus.

FIG. 11B illustrates the duty factor of the organic EL display 121 on a per frame basis. As shown in FIG. 11B, the ordinate represents the duty factor of the organic EL display 121 while the abscissa represents the frames $F_{51}$ through $F_{66}$ at time t.

FIG. 11C illustrates the currents consumed to display the frames. As shown in FIG. 11C, the ordinate represents the current (in A) consumed to display the frames while the abscissa represents the frames $F_{51}$ through $F_{66}$ at time t.

Figure 11:
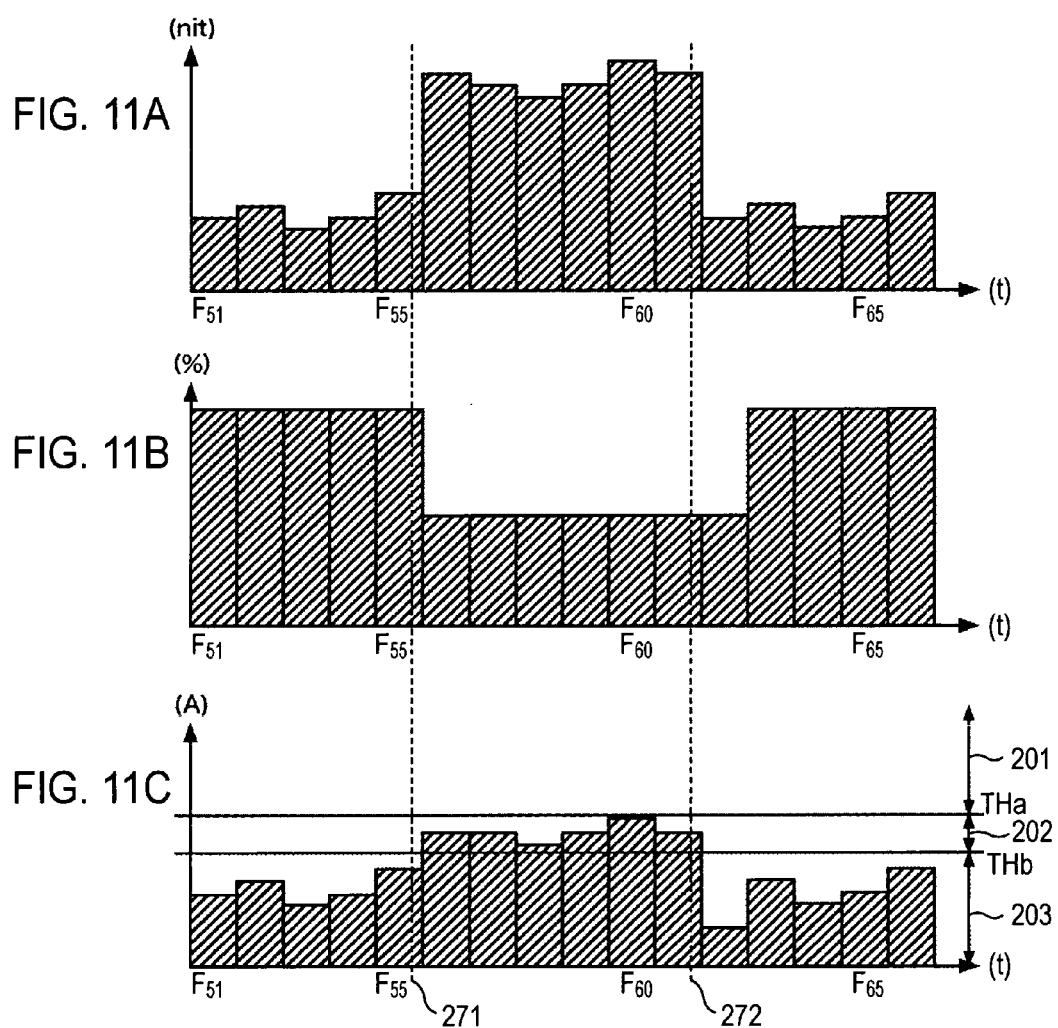
FIGS. 11A-11C illustrate a mean luminance within a frame, a duty factor of an organic EL display, and a current consumed to display the frame.

Broken lines 271 and 272 of FIG. 11 represent timings at which the application program is switched. Since the mean consumption current value of the frames $F_{51}$ through $F_{55}$ falls within a region 203 as shown in FIG. 11C, the duty factor is set to be 100% as shown in FIG. 11B.

When the apparatus is switched from the application program displaying the frames $F_{51}$ through $F_{55}$ to the application program displaying the frame $F_{56}$ through $F_{60}$, the frame $F_{56}$ having a high-luminance image is displayed as shown in FIG. 11A. As shown in FIG. 11B, the frame $F_{56}$ is the first frame after the switching of the application program, and the duty factor of the frame $F_{56}$ is set to be 50% in step S61 of FIG. 10.

Since the mean consumption current values of the frames $F_{56}$ through $F_{61}$ fall within a region 202, the duty factor remains unchanged from 50% as shown in FIG. 11B.

When the apparatus is switched from the application program displaying the frames $F_{56}$ through $F_{61}$ to the application program displaying the frames $F_{62}$ through $F_{66}$, the frame $F_{66}$ having a low-luminance image is displayed as shown in FIG. 11A. As shown in FIG. 11B, the frame $F_{56}$ is the first frame after the switching of the application program, and the duty factor of the frame $F_{56}$ is set to be 50% in step S61 of FIG. 10.

Figure 10:
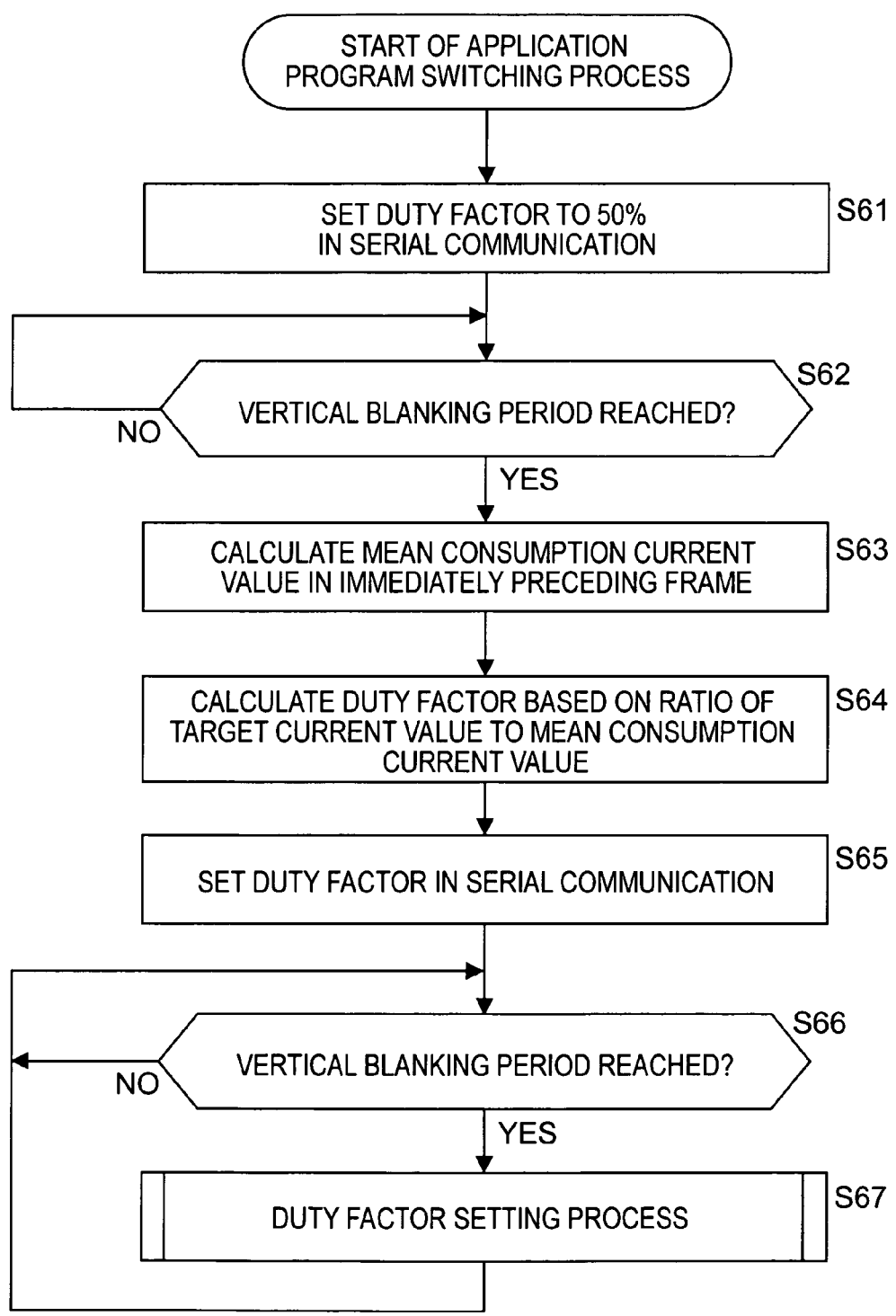
FIG. 10 is a flowchart illustrating a switching process of switching application programs.

Since the mean consumption current values of the frames $F_{62}$ through $F_{66}$ fall within the region 203, the duty factor is set to be 100% in step S64 of FIG. 10 as shown in FIG. 11B because the mean consumption current value is lower than the target current.

At the switching of the application program, only the first frame immediately after the switching is displayed as a dark image. In this way, a change in luminance responsive to the switching of the application program is adjusted. When an application program currently in operation is switched to another application program, the entire screen of the organic EL display 121 is switched. A large change occurs in luminance, requiring luminance adjustment. This means that a discontinued luminance as a result of adjustment is less outstanding at this timing, and less comfortable to the user.

The CPU 21 can predict the consumption current, and control the luminance of the display device 27. The specific structure of the controller 64, the luminance adjuster 65, the self-luminous display 66, the graphic engine 71, the VRAM 26, and the mean value calculator 72 shown in FIG. 2 are described below in this operation.

Figure 12:
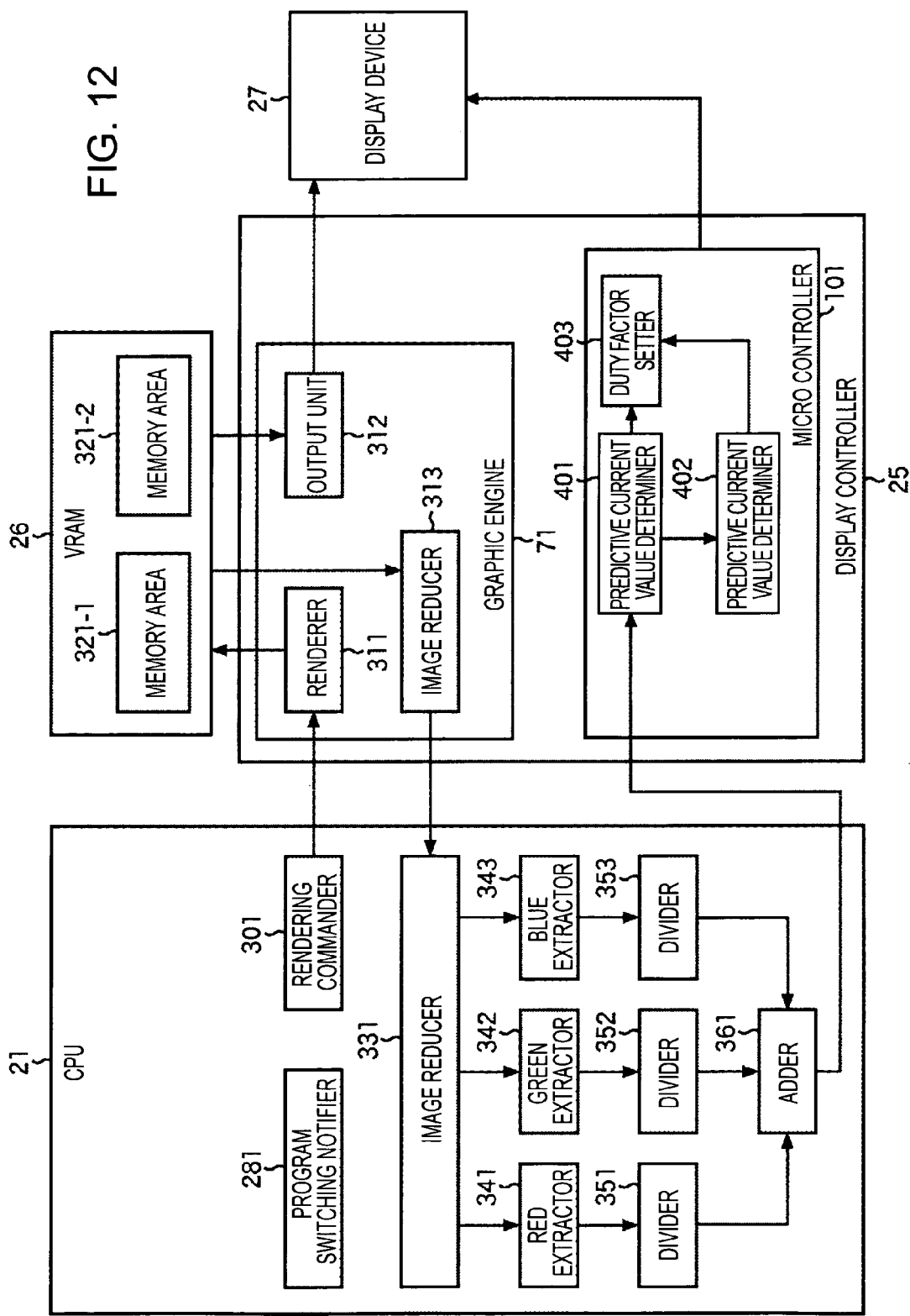
FIG. 12 is a block diagram illustrating the functional structure of the CPU and the display controller.

FIG. 12 is a block diagram illustrating the functional structure of the CPU 21, the VRAM 26, the graphic engine 71, and the micro controller 101.

By performing a control program, the CPU 21 embodies a program switching notifier 281, a rendering commander 301, an image reducer 331, a red extractor 341, a green extractor 342, a blue extractor 343, dividers 351 through 353, and an adder 361.

The VRAM 26 includes a memory area 321-1 and a memory area 321-2.

The graphic engine 71 includes a renderer 311, an output unit 312, and an image reducer 313.

By performing a duty setting program for setting the duty factor of each pixel in the displayed image, the micro controller 101 embodies a predictive current value determiner 401, a predictive current value determiner 402, and a duty factor setter 403.

In an operation similar to the operation of the program switching notifier 151, the program switching notifier 281 detects the selected application program in response to the signal supplied from the input unit 32 operated by the user, and notifies the micro controller 101 of the switching of the application program.

The rendering commander 301 commands the renderer 311 to generate the image data on one of a memory area 321-1 and a memory area 321-2 to display the image on the display device 27. In response to the command from the rendering commander 301, the renderer 311 renders the image (generates the image data) on one of the memory area 321-1 and the memory area 321-2.

The memory area 321-1 and the memory area 321-2 store the image data corresponding to two frames consecutively displayed in time sequence on the display device 27. For example, if the memory area 321-2 stores the image data of a frame image to be currently displayed on the display device 27, the memory area 321-2 stores the image data corresponding to a frame image to be displayed next on the display device 27.

The output unit 312 acquires the image data stored one of the memory area 321-1 and the memory area 321-2, and outputs the acquired image data to the display device 27 for presentation. If the memory area 321-2 stores the image data of the frame image to be currently displayed on the display device 27, and the memory area 321-1 stores the image data corresponding to the frame image to be displayed next on the display device 27, the output unit 312 acquires the image data from the memory area 321-2, and outputs the acquired image data to the display device 27 for presentation.

The image reducer 313 acquires the image data of the image stored in one of the memory area 321-1 and the memory area 321-2 and to be displayed onto the display device 27, and converts the image data to reduce the image to a predetermined size. For example, if the memory area 321-2 stores the image data of the frame image to be currently displayed on the display device 27, and the memory area 321-1 stores the image data corresponding to the frame image to be displayed next on the display device 27, the image reducer 313 acquires the image data from the memory area 321-1 to be displayed next on the display device 27, and converts the acquired image data to reduce the image to a predetermined size. The image reducer 313 supplies the image data of the reduced image to the image reducer 331 of the CPU 21.

The image reducer 331 reduces the image data of the image supplied from the image reducer 313 to image data of one pixel. The image reducer 331 reduces the image data to a single pixel by setting the mean value of the pixel values of all pixels forming the image data to the single pixel. The image reducer 331 then supplies the reduced single pixel image (pixel) to the red extractor 341, the green extractor 342, and the blue extractor 343.

The red extractor 341 extracts a red pixel value from the single pixel image supplied from the image reducer 331. The red extractor 341 supplies the extracted red pixel value to the divider 351.

The green extractor 342 extracts a green pixel value from the single pixel image supplied from the image reducer 331. The green extractor 342 supplies the extracted green pixel value to the divider 352.

The blue extractor 343 extracts a blue pixel value from the single pixel image supplied from the image reducer 331. The blue extractor 343 supplies the extracted blue pixel value to the divider 353.

The divider 351 divides the red pixel value supplied from the red extractor 341 by a predetermined coefficient. The coefficient, by which the divider 351 divides the red pixel value, represents the efficiency of red light emission of the display device 27. The efficiency of light emission refers to luminance of red light per unit current.

In other words, the divider 351 multiplies the red pixel value supplied by the red extractor 341 by the reciprocal of the coefficient representing the efficiency of red light emission.

By dividing the red pixel value by the coefficient, the current (predictive value) consumed to display a red image on the display device 27 is calculated. The divider 351 supplies the calculated value to the adder 361.

The divider 352 divides the green pixel value supplied from the green extractor 342 by a predetermined coefficient. The coefficient, by which the divider 352 divides the green pixel value, represents the efficiency of green light emission of the display device 27. The efficiency of light emission refers to luminance of green light per unit current.

In other words, the divider 352 multiplies the green pixel value supplied by the green extractor 342 by the reciprocal of the coefficient representing the efficiency of the green light emission.

By dividing the green pixel value by the coefficient, the current (predictive value) consumed to display a green image on the display device 27 is calculated. The divider 352 supplies the calculated value to the adder 361.

The divider 353 divides the blue pixel value supplied from the blue extractor 343 by a predetermined coefficient. The coefficient, by which the divider 353 divides the blue pixel value, represents the efficiency of blue light emission of the display device 27. The efficiency of light emission refers to luminance of blue light per unit current.

In other words, the divider 353 multiplies the blue pixel value supplied by the blue extractor 343 by the reciprocal of the coefficient representing the efficiency of the blue light emission.

By dividing the blue pixel value by the coefficient, the current (predictive value) consumed to display a blue image on the display device 27 is calculated. The divider 353 supplies the calculated value to the adder 361.

The dividers 351 through 353 predict the values of the currents required to display the next image on the display device 27 based on the pixel value of the next image. More specifically, each of the dividers 351 through 353 predicts the current value by dividing the mean value of the pixel values of the next image by the coefficient representing the light emission efficiency of the organic EL display 121 in the display device 27.

The adder 361 sums the quotients respectively supplied from the dividers 351 through 353. The sum calculated by the adder 361 is a predictive value of current to be consumed by the display device 27 (hereinafter referred to as a predictive mean consumption current value) with the image corresponding to the image data stored in the memory area 321-1.

The adder 361 calculates the mean value of the pixel values of the next image when the image reducer 331 reduces the next image to a single pixel image.

The adder 361 supplies the predictive current value determiner 401 in the micro controller 101 with the calculated predictive mean consumption current value.

In a process similar to the process of the current value determiner 172, the predictive current value determiner 401 determines whether the predictive mean consumption current value supplied from the adder 361 is above a predetermined threshold. If it is determined that the predictive mean consumption current value is above the predetermined threshold set in the predictive current value determiner 401, the predictive current value determiner 401 supplies, to the duty factor setter 403, the determination result that the predictive mean consumption current value is above the predetermined threshold.

The threshold the predictive current value determiner 401 compares with the predictive mean consumption current value serves as a determination criteria according to which a determination of whether the flow of a current having a magnitude subject to limitation is predicted is performed.

If it is determined that the predictive mean consumption current value is below the predetermined threshold, the predictive current value determiner 401 supplies, to the predictive current value determiner 402, the determination result indicating that the predictive mean consumption current value is below the predetermined threshold and the predictive mean consumption current value supplied from the adder 361.

In a process similar to the process of the current value determiner 173, the predictive current value determiner 402 responds to the supply of the determination result indicating that the predictive mean consumption current value is below the predetermined threshold and the predictive mean consumption current value. More specifically, the predictive current value determiner 402 determines whether the predictive mean consumption current value supplied from the predictive current value determiner 401 is above a predetermined threshold set in the predictive current value determiner 402.

The threshold the predictive current value determiner 402 compares with the predictive mean consumption current value is below the threshold of the predictive current value determiner 401, and is the one serving as a determination criterion of whether to restore display luminance.

The predictive current value determiner 402 supplies, to the duty factor setter 403, the determination result as to whether the predictive mean consumption current value is above the threshold set in the predictive current value determiner 402.

In a process similar to the process of the duty factor setter 174, the duty factor setter 403 calculates the duty factor of light-on and light-off operations of the image (pixel) displayed on the display device 27 (organic EL display 121) based on the determination result supplied from one of the predictive current value determiner 401 and the predictive current value determiner 402. The duty factor setter 403 supplies the calculated duty factor to the organic EL display driver 122 to set the calculated duty factor therewithin.

In other words, the duty factor setter 403 controls luminance of the display device 27 based on the predicted current value. More specifically, the duty factor setter 403 controls the luminance of the display device 27 by controlling the length of time of light emission of the display device 27 within the frame period based on the predicted current value.

If there is no need for discriminating between the memory area 321-1 and the memory area 321-2, the memory area is hereinafter simply designated with reference numeral 321.

The predictive current value determiner 401 through the duty factor setter 403 can be embodied by the CPU 21, and the image reducer 331 through the adder 361 can be embodied by the micro controller 101.

The duty factor setting process is described below with reference to flowcharts of FIGS. 13 and 14. The duty factor setting process is initiated in response to the switch-on of the PDA 1. In step S91, the image reducer 313 in the graphic engine 71 reduces the next image (image data) the renderer 311 has rendered on the memory area 321 of the VRAM 26. If the renderer 311 is in the middle of rendering the image on the memory area 321-1, the image reducer 313 waits until the renderer 311 completes the rendering of the image. Immediately when the renderer 311 completes the rendering, the image reducer 313 reduces the image (image data) stored on the memory area 321-1 in step S91. In other words, the image immediately prior to the image displayed on the display device 27 is reduced.

In step S92, the image reducer 331 in the CPU 21 reduces the image (image data) reduced in step S91 and stored in the memory area 321-1 to a single pixel.

In step S93, the red extractor 341 extracts the red pixel value from the single pixel image reduced in step S92.

In step S94, the divider 351 calculates the consumption current value predicted to be consumed by a red pixel (hereinafter referred to as a predictive consumption current value), based on the red pixel value extracted in step S93 and the predetermined coefficient. More specifically, the divider 351 divides the red pixel value supplied from the red extractor 341 by the predetermined coefficient. The coefficient, by which the divider 351 divides the red pixel value, means the efficiency of red light emission of the display device 27. The efficiency of red light emission refers to luminance of red light per unit current. By dividing the red pixel value by the coefficient, the current value (predictive value) consumed to display a red image on the display device 27 is calculated.

In step S95, the green extractor 342 extracts the green pixel value from the single pixel image reduced in step S92.

In step S96, the divider 352 calculates the consumption current value predicted to be consumed by a green pixel, based on the green pixel value extracted in step S95 and the predetermined coefficient. More specifically, the divider 352 divides the green pixel value supplied from the green extractor 342 by the predetermined coefficient. The coefficient, by which the divider 352 divides the green pixel value, means the efficiency of green light emission of the display device 27. The efficiency of green light emission refers to luminance of green light per unit current. By dividing the green pixel value by the coefficient, the current value (predictive value) consumed to display a green image on the display device 27 is calculated.

In step S97, the blue extractor 343 extracts the blue pixel value from the single pixel image reduced in step S92.

In step S98, the divider 353 calculates the consumption current value predicted to be consumed by a blue pixel, based on the blue pixel value extracted in step S97 and the predetermined coefficient. More specifically, the divider 353 divides the blue pixel value supplied from the blue extractor 343 by the predetermined coefficient. The coefficient, by which the divider 353 divides the blue pixel value, means the efficiency of blue light emission of the display device 27. The efficiency of blue light emission refers to luminance of blue light per unit current. By dividing the blue pixel value by the coefficient, the current value (predictive value) consumed to display a blue image on the display device 27 is calculated.

Processes in steps S93, S95 and S97 are sequentially performed. Alternatively, the processes in steps S93, S95 and S97 can be performed in parallel. Similarly, processes in steps S94, S96, and S98 are sequentially performed. Alternatively, the processes in steps S94, S96, and S98 can be performed in parallel.

Even given the same luminance, currents consumed to display images are different from color to color, and thus the coefficients used by the dividers 351 through 353 are different from each other.

In step S99, the adder 361 sums three predictive consumption current values calculated in steps S94, S96, and S98, and calculates the mean current value (predictive mean consumption current value) predicted to be consumed to display the image of the image data stored in the memory area 321-1 and reduced in step S91.

In step S100 of FIG. 14, the predictive current value determiner 401 determines whether the predictive mean consumption current value calculated in step S99 is above the upper threshold THa (see FIG. 15).

If it is determined in step S100 that the predictive mean consumption current value calculated in step S99 is not above the upper threshold THa, processing proceeds to step S101. The predictive current value determiner 402 determines whether the predictive mean consumption current value calculated in step S99 is not above the lower threshold THb.

If it is determined in step S101 that the predictive mean consumption current value calculated in step S99 is not above the lower threshold THb, processing proceeds to step S102. The duty factor setter 403 determines whether the duty factor is 100%.

If it is determined in step S102 that the duty factor is 100%, processing proceeds to step S103. In serial communications, the duty factor setter 403 causes the organic EL display driver 122 in the display device 27 to set a duty factor of 100%.

Figure 15A:
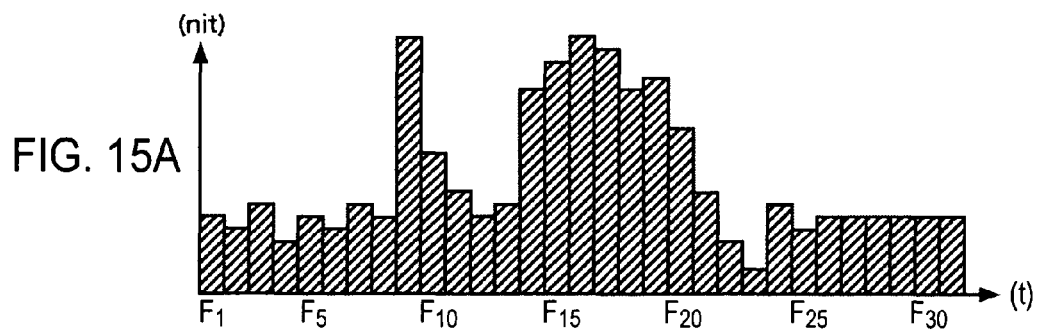
FIGS. 15A-15C illustrate a mean luminance within a frame, a duty factor of an organic EL display, and a current consumed to display the frame.
Figure 15B:
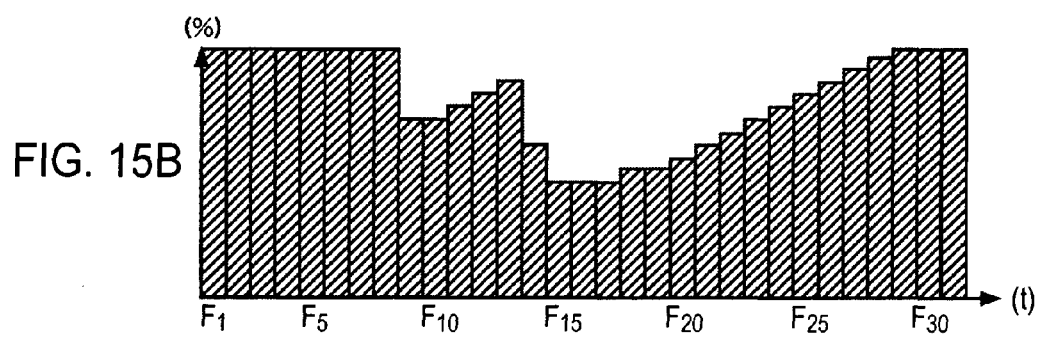
Figure 15C:
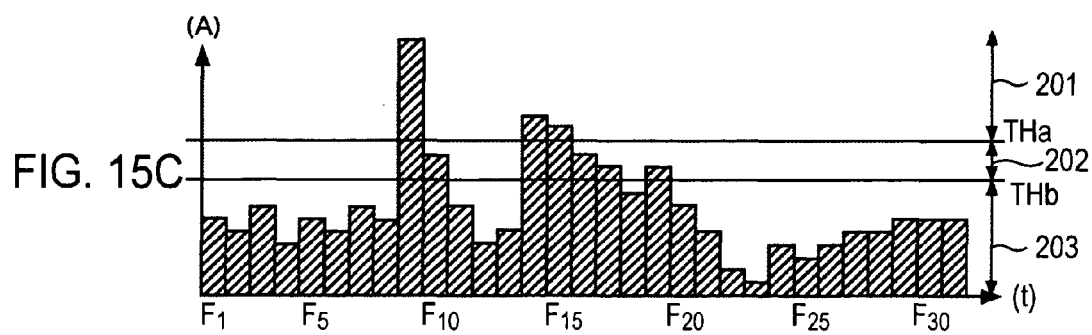

FIGS. 15A-15C illustrate the mean luminance of the frame, the duty factor of the organic EL display 121 in the display device 27, and the relationship of the currents consumed to display the frame.

FIG. 15A is identical to FIG. 8A, and the discussion thereof is omitted herein.

FIG. 15B illustrates the duty factor of the organic EL display 121 in the display device 27 on a per frame basis. As shown in FIG. 15B, the ordinate represents the duty factor (%) of the organic EL display 121 in the display device 27, and the abscissa represents frames $F_1$ through $F_{31}$ at time t.

FIG. 15C is identical to FIG. 8C, and the discussion thereof is omitted herein.

As shown in FIG. 15C, predictive mean consumption current values of frames $F_1$ through $F_8$ are neither above the upper threshold THa nor above the lower threshold THb. If the duty factor is 100% as shown in FIG. 15B, a duty factor of 100% is maintained.

If it is determined in step S100 that the predictive mean consumption current value calculated in step S99 is above the upper threshold THa, processing proceeds to step S104. The duty factor setter 403 calculates the duty factor based on the ratio of the target current to the predictive mean consumption current value calculated in step S99.

More specifically, let $D_n$ represent the duty factor of the currently displayed frame, $I_{target}$ represent a target current, and $I_n$ represent the predictive mean consumption current value, and a duty factor $D_{n+1}$ calculated by the duty factor setter 403 in step S104 is expressed by the following equation (2).

$$D_{n+1} = D_n \times I_{target} / I_n \qquad (2)$$

Processing proceeds to step S103 subsequent to step S104. In serial communications, the duty factor setter 403 causes the organic EL display driver 122 in the display device 27 to set the duty factor $D_{n+1}$ calculated in step S104.

As shown in FIG. 15C, frame $F_9$ is above the upper threshold THa. The duty factor $D_{n+1}$ calculated in step S104 is set at the timing the frame $F_9$ is displayed as shown in FIG. 15B. The duty factor is smaller than the duty factor of frame $F_8$, i.e., 100%.

If it is determined in step S101 that the predictive mean consumption current value calculated in step S99 is above the lower threshold THb, processing proceeds to step S103. The duty factor setter 403 performs serial communications to cause the organic EL display driver 122 in the display device 27 to set the current duty factor.

If it is determined in step S101 that the predictive mean consumption current value is above the lower threshold THb, the predictive mean consumption current value falls within a region 202 as shown in FIG. 15C. In the region 202, the duty factor is not changed to display an image comfortable to the user. If luminance on the organic EL display 121 changes frequently, the resulting image becomes uncomfortable to the user.

If the determination process in step S101 is performed on frame $F_{10}$ of FIG. 15B, the same duty factor as the frame $F_9$ is set at the timing the frame $F_{10}$ is displayed on the display device 27.

If it is determined in step S102 that the duty factor is not 100%, processing proceeds to step S105. The duty factor setter 403 increases the duty factor by a predetermined amount. For example, the duty factor setter 403 increases the current duty factor by 1% in step S105.

If the predictive mean consumption current value is below the lower threshold THb as in frames $F_{20}$ through $F_{31}$ of FIG. 15C, in other words, if the predictive mean consumption current value falls within a region 203, the duty factor is increased bit by bit.

The duty factor is restored bit by bit when dark frames, such as frames $F_{20}$ through $F_{31}$, are displayed after decreasing the duty factor in a bright frame, such as in the frame $F_{15}$.

If the duty factor is suddenly changed by a large amount, a resulting image displayed on the organic EL display 121 becomes uncomfortable to see. For this reason, the duty factor is successively changed bit by bit.

The duty factor is restored back (rises) bit by bit in a ramp in frame $F_{20}$ through frame $F_{31}$ as shown in FIG. 15B.

Processing returns to step S91 of FIG. 13 subsequent to step S103 to repeat the above-referenced process.

The predictive mean consumption current value is thus calculated based on the image data, stored in the memory area 321-1, corresponding to the frame image before being displayed on the display device 27. The duty factor of the frame image is set. The frame image corresponding to the image data stored in the memory area 321-1 is displayed with the set duty factor.

Without even one frame of delay, the organic EL display 121 in the display device 27 displays images at the duty factor set based on the images to be displayed. In a manner free from destroying high displaying power of the self-luminous display element, a large consumption current is thus prevented from flowing. In other words, excessive power consumption of the battery due to high-luminance frame image is prevented.

When a high-luminance frame, such as one of the frames $F_{15}$ through $F_{20}$ is transitioned to a low-luminance frame, such as one of the frames $F_{21}$ through $F_{31}$, the duty factor is set to rise bit by bit. Even if a high-luminance frame such as the frame $F_9$ is suddenly displayed, the capacitor 61 lightens the load imposed on the removable main battery 57. The high-luminance image is displayed while the PDA 1 is reliably operated. The removable main battery 57 provides a longer service life.

With the power of the removable main battery 57 saved, the removable main battery 57 is prevented from generating heat.

The application program switching process discussed with reference to FIGS. 10 through 11 can be performed in the embodiment of the present invention discussed with reference to FIGS. 12 through 15.

The information processing apparatus of the embodiment of the present invention is not limited to the PDA 1 of FIG. 1. The present invention is applicable to any information processing apparatus that controls recording and reading of data onto a recording medium. More specifically, the present invention is applicable to a mobile telephone, and digital electronics, such as a notebook computer and a portable television receiver.

With the luminance of the image adjusted in a manner described above, bright images are displayed. Self-luminous display means is arranged, and current predicting means predicts the value of a current the self-luminous display means needs to display a next image based the pixel value of the next image. Control means controls the luminance of the self-luminous display means based on the predicted current value. In this arrangement, a high-luminance image is displayed while the service time of the battery is prolonged.

The above-references series of steps can be performed by software, or hardware. If the series of steps is performed by software, a program forming the software is installed from a recording medium onto a computer incorporated into a hardware structure or to a general-purpose computer, for example.

The recording media include a package medium loaded onto an external drive connected via the cradle 54 of FIG. 1 and storing the program and supplied to the user separate from the computer. The recording media include a magnetic disk (including a flexible disk), an optical disk (such as a compact disk read-only memory (CD-ROM) and a digital versatile disk (DVD)), a magneto-optic disk such as MD® (Mini Disk), and a semiconductor memory (such as the MS 51 and the CF 52). The recording media also include a read-only memory and a hard disk, each storing the program and supplied in a computer to the user.

The computer program executing the series of process steps can be installed through an interface such as a router and a modem onto the computer via one of a wired communication medium and a wireless communication medium such as a local area network, the Internet, and a digital broadcast satellite.

The process steps discussed in this specification are sequentially performed in the time sequence order as stated. Alternatively, the steps may be performed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   self-luminous type display means for displaying a series of images using a plurality of pixels;
   electrical current value predicting means for predicting an electrical current value required by the display means that displays a next image using a mean pixel value of the plurality of pixels for the next image; and
   control means for controlling a luminance of the display means based on the predicted electrical current value by controlling a duty factor, the duty factor controlling a length of time throughout which the display means emits light to display an image, including reducing the duty factor for the next image when the predicted electrical current value is above an upper threshold, and increasing the duty factor for the next image by a predetermined amount when the predicted electrical current value is below a lower threshold,
   the control means maintaining the duty factor from a current image for the next image when the predicted electrical current value is between the lower and upper thresholds, and
   the control means increasing the duty factor for images subsequent to the next image by the same predetermined amount when predicted electrical current values for the subsequent images, respectively, are below the lower threshold.

2. The information processing apparatus according to claim 1, wherein the electrical current value predicting means predicts the electrical current value by dividing the mean value of the plurality of pixels for the next image by a coefficient representing an efficiency of light emission of the display means.

3. The information processing apparatus according to claim 2, the electrical current value predicting means including a mean value calculator configured to calculate the mean value of the plurality of pixels of the next image by reducing the next image to a single pixel.

4. An information processing method of an information processing apparatus, the method comprising:
   displaying a series of images using a plurality of pixels of a display unit;
   predicting an electrical current value required by the display unit for displaying a next image using a mean pixel value of the plurality of pixels for the next image;
   controlling a luminance of the display unit using the predicted electrical current value by controlling a duty factor, the duty factor controlling a length of time throughout which the display means emits light to display an image, including reducing the duty factor for the next image when the predicted electrical current value is above an upper threshold, and increasing the duty factor for the next image by a predetermined amount when the predicted electrical current value is below a lower threshold;
   maintaining the duty factor from a current image for the next image when the predicted electrical current value is between the lower and upper thresholds; and
   increasing the duty factor for images subsequent to the next image by the same predetermined amount when predicted electrical current values for the subsequent images, respectively, are below the lower threshold.

5. A recording medium storing a computer program for causing a computer to process information, the computer program comprising program code for performing steps:
   displaying a series of images using a plurality of pixels of a display unit;

predicting an electrical current value required by the display unit for displaying a next image using a mean pixel value of the plurality of pixels for the next image; and controlling a luminance of the display unit using the predicted electrical current value by controlling a duty factor, the duty factor controlling a length of time throughout which the display means emits light to display an image, including reducing the duty factor for the next image when the predicted electrical current value is above an upper threshold, and increasing the duty factor for the next image by a predetermined amount when the predicted electrical current value is below a lower threshold;

maintaining the duty factor from a current image for the next image when the predicted electrical current value is between the lower and upper thresholds; and increasing the duty factor for images subsequent to the next image by the same predetermined amount when predicted electrical current values for the subsequent images, respectively, are below the lower threshold.

6. A non-transitory computer readable medium including computer executable instructions, wherein the instructions, when executed by a processor, cause the processor to perform a method comprising:

displaying a series of images using a plurality of pixels of a display unit;

predicting an electrical current value required by the display unit for displaying the next image using a mean pixel value of the plurality of pixels for the next image; and controlling a luminance of the display unit using the predicted electrical current value by controlling a duty factor, the duty factor controlling a length of time throughout which the display means emits light to display an image, including reducing the duty factor for the next image when the predicted electrical current value is above an upper threshold, and increasing the duty factor for the next image by a predetermined amount when the predicted electrical current value is below a lower threshold;

maintaining the duty factor from a current image for the next image when the predicted electrical current value is between the lower and upper thresholds; and increasing the duty factor for images subsequent to the next image by the same predetermined amount when predicted electrical current values for the subsequent images, respectively, are below the lower threshold.

7. An information processing apparatus, comprising:

a self-luminous type display unit configured to display a series of images using a plurality of pixels;

an electrical current value predicting unit configured to predict an electrical current value required by the display unit to display a next image using a mean pixel value of the plurality of pixels for the next image; and a controller configured to control a luminance of the display using the predicted electrical current value by controlling a duty factor, the duty factor controlling a length of time throughout which the display means emits light to display an image, including reducing the duty factor for the next image when the predicted electrical current value is above an upper threshold, and increasing the duty factor for the next image by a predetermined amount when the predicted electrical current value is below a lower threshold, the controller maintaining the duty factor from a current image for the next image when the predicted electrical current value is between the lower and upper thresholds, and the controller increasing the duty factor for images subsequent to the next image by the same predetermined amount when predicted electrical current values for the subsequent images, respectively, are below the lower threshold.

8. The information processing apparatus according to claim 7, wherein the electrical current value predicting unit is configured to predict the electrical current value by dividing the mean value of the plurality of pixels for the next image by a coefficient representing an efficiency of light emission of the display unit.

9. The information processing apparatus according to claim 8, the electrical current value predicting unit including a mean value calculator configured to calculate the mean value of the plurality of pixels of the next image by reducing the next image to a single pixel.

10. The information processing apparatus according to claim 3, wherein the mean value calculator is configured to extract pixel values of component colors of the single pixel, divide the pixel values by respective component color coefficients, and sum quotients thereof to calculate the mean pixel value, and the component color coefficients are ratios of electrical current to luminance of respective component colors.

11. The information processing apparatus according to claim 10, wherein the component colors include red, green and blue.

12. The information processing apparatus according to claim 1, wherein the predetermined amount is 1% of a maximum duty factor to avoid a sudden increase in duty factor by a large amount.

* * * * *